(12) United States Patent
Greiner et al.

(10) Patent No.: US 9,589,206 B2
(45) Date of Patent: Mar. 7, 2017

(54) OPTIMIZING AN IMAGE FILTER

(71) Applicant: HOCHSCHULE PFORZHEIM, Pforzheim (DE)

(72) Inventors: Thomas Greiner, Frankenthal (DE); Tobias Gehrke, Stuttgart (DE)

(73) Assignee: HOCHSCHULE PFORZHEIM, Pforzheim (DE)

(*) Notice: Subject to any disclaimer, the term of this patent is extended or adjusted under 35 U.S.C. 154(b) by 174 days.

(21) Appl. No.: 14/097,933

(22) Filed: Dec. 5, 2013

(65) Prior Publication Data

US 2015/0161772 A1 Jun. 11, 2015

(51) Int. Cl.
| | | |
|---|---|---|
| G06K 9/40 | (2006.01) | |
| G06K 9/36 | (2006.01) | |
| G06K 9/62 | (2006.01) | |
| G06T 3/00 | (2006.01) | |
| H04N 19/60 | (2014.01) | |
| H04N 19/635 | (2014.01) | |

(52) U.S. Cl.
CPC .......... *G06K 9/6201* (2013.01); *G06T 3/0056* (2013.01); *H04N 19/60* (2014.11); *H04N 19/635* (2014.11)

(58) Field of Classification Search
None
See application file for complete search history.

(56) References Cited

U.S. PATENT DOCUMENTS

| | | | | |
|---|---|---|---|---|
| 5,844,951 A | * | 12/1998 | Proakis .................. | H04B 7/086 375/233 |
| 7,245,783 B2 | * | 7/2007 | Fielding ................. | G06T 7/408 345/632 |
| 7,295,614 B1 | * | 11/2007 | Shen ..................... | H04N 19/147 375/240.25 |

(Continued)

FOREIGN PATENT DOCUMENTS

| | | |
|---|---|---|
| CN | 102156973 A | 8/2011 |
| CN | 102832908 A | 12/2012 |
| WO | WO 2009/110673 A1 | 9/2009 |

OTHER PUBLICATIONS

Gehrke, T.; Greiner, T.; Rosenstiel, W., "Image content matched directional filters for image coding based on contourlet transform," Picture Coding Symposium (PCS), 2013 , vol., No., pp. 237,240, Dec. 8-11, 2013.*

Gehrke, T.; Greiner, T., "Design of optimized contourlet filters for improved coding gain," Signal Processing Conference (EUSIPCO), 2014 Proceedings of the 22nd European , vol., No., pp. 546,550, Sep. 1-5, 2014.*

(Continued)

*Primary Examiner* — Andrae S Allison
(74) *Attorney, Agent, or Firm* — Harrity & Harrity, LLP

(57) ABSTRACT

A system may receive filter coefficients defining a digital filter. The system may select a signal processing quality criterion which describes a transformation that can be derived from an image and further describes the reconstruction of the image that can be derived from the transformation. The system may determine a degree of optimization that quantifies the signal processing quality criterion with the received filter coefficients. The system may vary the filter coefficients to obtain varied filter coefficients. The (Continued)

system may establish the degree of optimization with the varied filter coefficients. The system may compare the determined degree of optimization with the established degree of optimization.

20 Claims, 13 Drawing Sheets
(5 of 13 Drawing Sheet(s) Filed in Color)

(56) References Cited

U.S. PATENT DOCUMENTS

| | | | | |
|---|---|---|---|---|
| 8,139,880 B2* | 3/2012 | Xu | ................... | G06F 17/147 375/240.03 |
| 2004/0062310 A1* | 4/2004 | Xue | ................... | H04N 19/0089 375/240.16 |
| 2004/0234009 A1* | 11/2004 | Fimoff | ................... | H04L 25/0212 375/343 |
| 2004/0240587 A1* | 12/2004 | Ozen | ................... | H04L 25/023 375/340 |
| 2007/0031058 A1* | 2/2007 | Hatzinakos | ................... | G06T 3/4076 382/265 |
| 2011/0182355 A1* | 7/2011 | Kim | ................... | H04N 19/635 375/240.02 |
| 2012/0033040 A1* | 2/2012 | Pahalawatta | ................... | H04N 19/597 348/43 |

OTHER PUBLICATIONS

M. D. Adams and D. Xu, "Optimal design of high-performance separable wavelet filter banks for image coding," Signal Processing, vol. 90, No. 1, pp. 180-196, 2010.*

J. Katto and Y. Yasuda, "Performance evaluation of subband coding and optimization of its filter coefficients", SPIE Proc. Visual Commun. Image Process., pp. 95-106, 1991.*

Cunha et al., "On Two-channel Filter Banks with Directional Vanishing Moments," IEEE Transactions on Image Processing, May 2005, 12 pages.

Do et al., "The Contourlet Transform: An Efficient Directional Multiresolution Image Representation," IEEE Transactions on Image Processing, vol. 14, No. 12, Dec. 2005, 16 pages.

Yang et al., "Contourlet Filter Design Based on Chebyshev Best Uniform Approximation," EURASIP Journal on Advances in Signal Processing, vol. 2010, Article ID 398385, Mar. 17, 2010, 10 pages.

Phoong, See-May, et al. "A new class of two-channel biorthogonal filter banks and wavelet bases." *IEEE Transactions on Signal Processing* 43.3 (1995): 649-665.

Gonzalez, Rafael C., and Richard E. Woods. "Digital image processing," 3$^{rd}$ Edition (2008): pp. 463-466.

Wang, Zhou, et al. "Image quality assessment: from error visibility to structural similarity." *IEEE transactions on image processing* 13.4 (2004): pp. 600-612.

* cited by examiner

| | | | | | | |
|---|---|---|---|---|---|---|
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0.000477527 |
| 0 | 0 | 0 | 0 | 0 | −0.00287122 | 0 |
| 0 | 0 | 0 | 0 | 0.000477527 | 0 | −0.0149738 |
| 0 | 0 | 0 | 0.000463544 | 0 | 0.00249036 | 0 |
| 0 | 0 | 0.000396075 | 0 | 0.00241743 | 0 | 0.0119381 |
| 0 | 0.0000826233 | 0 | 0.00206558 | 0 | 0.0115856 | −0.00872762 |
| 0.000015843 | 0 | 0.00043089 | 0 | 0.56990186 | −0.00334703 | 0.0135626 |
| 0 | 0.0000826233 | 0 | 0.00206558 | 0 | 0.0115856 | −0.00872762 |
| 0 | 0 | 0.000396075 | 0 | 0.00241743 | 0 | 0.0119381 |
| 0 | 0 | 0 | 0.000463544 | 0 | 0.00249036 | 0 |
| 0 | 0 | 0 | 0 | 0.000477527 | 0 | −0.0149738 |
| 0 | 0 | 0 | 0 | 0 | −0.00287122 | 0 |
| 0 | 0 | 0 | 0 | 0 | 0 | 0.000477527 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |

FIG 3

OPTIMIZING AN IMAGE FILTER

BACKGROUND

The efficient representation of visual information is important for many image processing tasks, including compression, noise reduction, feature extraction, and inverse problems. Efficiency of a representation refers to the ability to capture significant information about an image using minimal storage space.

For image compression or content-based image retrieval, the use of an efficient representation implies the compactness of the compressed file or the index entry for each image in the database. For practical applications, such an efficient representation can be obtained via an image transform including a digital image filter.

SUMMARY

According to an aspect, a computer-implemented method for optimizing a digital filter. The digital filter may be an analysis filter that can be applied to an image as part of a directional transform in order to derive a transformation from the image. Alternatively, the digital filter may be a synthesis filter that can be applied to the transformation in order to derive a reconstruction of the image from the transformation. The method may comprise receiving, by a processor, filter coefficients defining the digital filter. The method may further comprise selecting, by the processor, a signal processing quality criterion which describes the transformation that can be derived from the image and further describes the reconstruction of the image that can be derived from the transformation. Also, the method may comprise determining, by the processor, a degree of optimization that quantifies the signal processing quality criterion with the received filter coefficients. Moreover, the method may comprise varying, by the processor, the filter coefficients to obtain varied filter coefficients. The method may further comprise establishing, by the processor, the degree of optimization with the varied filter coefficients. In addition, the method may comprise comparing, by the processor, the determined degree of optimization with the established degree of optimization.

The method above may be implemented in a system or a computer-readable medium.

BRIEF DESCRIPTION OF THE FIGURES

The patent or application file contains at least one drawing executed in color. Copies of this patent or patent application publication with color drawing(s) will be provided by the Office upon request and payment of the necessary fee.

FIG. 3 depicts a partial set of filter coefficients of an exemplary fan-shaped analysis filter.

DETAILED DESCRIPTION

Figure 1:
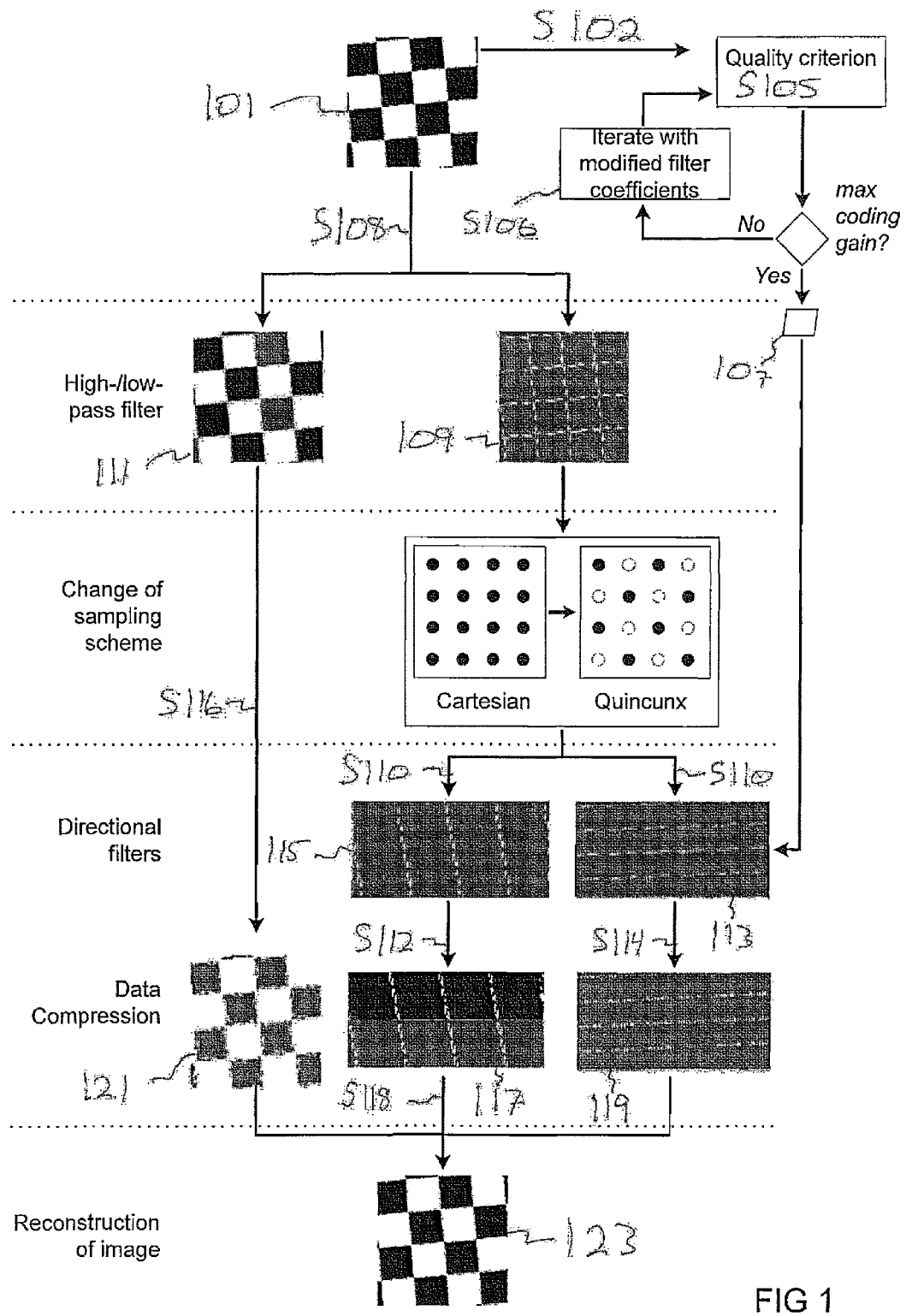
FIG. 1 depicts an example of applying a directional transform to an image.

The subject matter described in this application can be implemented as a method or on a device, possibly in the form of one or more computer program products. The subject matter described in the application can be implemented in a data signal or on a machine readable medium, where the medium is embodied in one or more information carriers, such as a CD-ROM, a DVD-ROM, a Blu-Ray disc, a semiconductor memory, or a hard disk. Such computer program products may cause a data processing apparatus to perform one or more operations described in the application.

In addition, subject matter described in the application can also be implemented as a system including a processor, and a memory coupled to the processor. The memory may encode one or more programs to cause the processor to perform one or more of the methods described in the application. Further subject matter described in the application can be implemented using various machines.

For simplicity and illustrative purposes, the principles of the claimed subject matter are described mainly by referring to examples thereof. In the following description, numerous specific details are set forth in order to provide a thorough understanding of the examples. It will be apparent however, to one of ordinary skill in the art, that the examples may be practiced without limitation to these specific details. In some instances, well known methods and structures have not been described in detail so as not to unnecessarily obscure the examples. The examples may be used or performed together in different combinations.

Moreover, a number of steps are described below. The order of these steps may be modified, even when this is not explicitly stated.

Technical Definitions

In the following description, a number of technical terms are used. Exemplary definitions of these terms are provided below. These definitions should be understood in view of general knowledge in the technical field of the application. The definitions may cascade. For example, a separable filter may have one or more of characteristics of a filter.

A processor, as used herein, refers to central processing units, microprocessors, microcontrollers, reduced instruction set circuits (RISC), digital logic circuits such as a Field-Programmable Gate Arrays (FPGA) or application specific integrated circuits (ASIC), and any other circuit or processor capable of executing the functions described herein.

The terms "software" and "firmware" are interchangeable, and include any computer program (or computer program product) stored in memory for execution by a processor, including RAM memory, ROM memory, EPROM memory, EEPROM memory, and non-volatile RAM (NVRAM) memory. The above memory types are exemplary only, and are thus not limiting as to the types of memory usable for storage of the computer program (or computer program product).

An image (i.e. a digital image) may be represented in a computer as an array (e.g. with 2 or more dimensions) of intensity levels. Coefficients of the image may refer to elements of the array. The image may be discrete, sampled and defined on a rectangular grid.

An edge may be understood as a set of points of intensity level discontinuity, i.e. a set of connected pixels at which the intensity of an image changes abruptly. Thus, an edge is formed from pixels with derivative values that exceed a preset threshold. Edges may be located along smooth curves, i.e. contours.

Directional structures include elements of the image that have a direction, e.g. edges or textures.

A filter (e.g. a digital filter or a digital image filter) may be represented in a computer via a set of filter coefficients, e.g. the filter may consist of the filter coefficients. The filter coefficients form elements of an array. The array of filter coefficients may have one dimension or multiple dimensions. Filtering involves applying the array to each pixel and its neighbors within an image.

A separable filter is applied to rows and then to columns of an image. In other words, the separable filter is applied to the image row-wise and column-wise in separable fashion. A separable filter may be efficient to implement but can only properly represent horizontal, vertical and diagonal (45 degree) image structures (e.g. edges) in a filtered image.

A non-separable filter may be represented in a computer as a two-dimensional array (i.e. a matrix) of filter coefficients. The non-separable filter may be applied as a block to the entire image (e.g. by applying the non-separable filter over the image and calculating a value depending on values of the image and the filter coefficients), rather than to separate rows and columns of the image.

A partial filter (e.g. a partial analysis filter or partial synthesis filter) may be designed to be applied to a subset (e.g. a proper subset) of the pixels of the image. In other words, the partial filter may be suitable for filtering a part of the image. A lifting filter is an example of the partial filter. In the context of the lifting filter, the subset of the pixels of the image may be referred to as a polyphase component of the image.

A complete filter may be designed to be applied to all of the pixels of the image. In other words, the lifting filter may be suitable for filtering the entire image. An example of a complete filter is a fan-shaped filter.

A directional filter may be a non-separable filter that is able to properly represent edges have more directions than horizontal, vertical and diagonal in a filtered image. In other words, a directional filter may more efficiently represent edge orientations of an image than a separable filter. A directional filter may have directional sensitivity.

A filter bank is a combination of different filters. Each filter in the filter bank corresponds to different image properties. In the simplest case, a filter bank is a combination of a high pass filter (a filter that allows high-frequency signals to pass through) and a low pass filter (a filter that allows low-frequency signals to pass through).

A transform can be applied to an image in order to derive a transformation from the image. The transform may include one or more filters, e.g. the filter bank. The transform may operate in the discrete domain or the continuous domain. The transform may employ separable filters, e.g. a discrete cosine transform or a wavelet transform. The transform may employ non-separable filters. The transform may be one-dimensional or two dimensional.

A directional transform may be applied to the image (or the high pass part of the image) in order to derive a transformation from the image that includes basis elements oriented in a variety of directions. The directional transform may be two-dimensional. The directional transform may apply directional filters to the image in a non-separable fashion, i.e. the directional filters may be non-separable filters and may be applied to the entire image rather than individual rows or columns.

The directional transform may have one or more of the following properties: applicability to discrete images, efficient implementation using filter banks, minimal redundancy.

The Contourlet transform is an example of the directional transform. The Contourlet transform is described in M. N. Do and M. Vetterli, "The Contourlet transform: An efficient directional Multiresolution image representation", IEEE Transactions on Image Processing, vol. 14, no. 12, pp. 2091-2106, 2005, which is incorporated herein by reference (hereinafter, the "Contourlet transform paper").

The Contourlet transform, and other directional transforms, are generally applied with generic filter coefficients. In other words, the filter coefficients are the same for every image to which the directional transform is applied. The Contourlet transform may be implemented using a cascaded filter bank.

A transformation may be derived from the image using the transform, e.g. the directional transform. The transformation may also be referred to as a representation, or a processed signal. The transformation may be a compressed image, i.e. a compressed version of the original image. It may be possible to code the transformation more effectively than the image from which the transformation is derived, e.g. due to the transformation's ability to decorrelate information of the image. The transformation may also be represented (e.g. consist of) an array of coefficients.

The transformation may have one or more of the following properties:
  multiresolution: the transformation allows an image to be successively approximated, from coarse to fine resolutions;
  localization: the basis elements in the transformation are localized in both the spatial and the frequency domains;
  critical sampling: for some applications (e.g., compression), the transformation forms a basis, or a frame with small redundancy;
  directionality: the transformation contains basis elements oriented at a variety of directions, much more than the few directions that are offered by a transform that applies separable filters, such as separable wavelets;
  anisotropy: to capture smooth contours in images, the transformation contains basis elements using a variety of elongated shapes with different aspect ratios.

The efficiency of the transformation refers to the ability to capture significant information about the image using minimal storage space.

A reconstruction is derived from a transformation of an image. The reconstruction of the image (i.e. the reconstruction) may be derived from the transformation via synthesis filtering and decompression. The reconstruction may also be referred to as the decompressed image, e.g. because the reconstruction is derived from the compressed transformation via a process involving decompression.

An analysis filter can be applied within in a transform in order to derive a transformation from an image. In other words, analysis filters are applied to an image in order to transform the image, e.g. as part of a directional transform. The analysis filter may be a directional filter.

A synthesis filter can be applied in order to reconstruct (i.e. reconstitute) an image from a transformation. Thus, the transformation is derived from the image using analysis filters and the reconstruction of the image is derived from the transformation using synthesis filters.

Accordingly, in the context of digital filters, the terms analysis and synthesis are used to distinguish filters by when the filters are applied. In some cases, the synthesis filters are derived from the analysis filters by performing mathematical operations on the filter coefficients of the analysis filters. Similarly, analysis filters may be derived from synthesis filters by performing mathematical operations on the filter coefficients of the synthesis filters.

Numerical optimization, also referred to as mathematical optimization, may be understood as the selection of a best element (with regard to some criteria) from some set of available alternatives.

A quantified signal processing quality criterion, i.e. a degree or measure of optimization, refers to one or more numeric values that quantitatively describe a transformation of an image and a reconstruction of the image derived from the transformation. The quantified signal processing criterion measures how well the image has been transformed (e.g. compressed) by the transform. The quantified signal processing criterion quantifies error of the reconstructed image (i.e. reconstruction error) compared to the original image. Models of transform and reconstruction may be used to compute the quantified signal processing quality criterion.

Determining a degree of optimization that quantifies a signal processing quality criterion with filter coefficients may involve evaluating a transformation derived from an image using the filter coefficients in order to determine a value that describes the quality of the transformation. Determining the degree of optimization may also involve evaluating a reconstruction of the image derived from the transformation in order to determine another value that describes the quality of the reconstruction.

A generic filter (e.g. a generic directional filter), also referred to as a standard filter, is composed of generic filter coefficients. A generic filter can be applied to any image. The coefficients of the generic filter are, in general, not matched to the contents of the image.

An optimized filter (e.g. an optimized directional filter) may also be referred to as a matched filter or a tailored filter. An optimized filter may be represented in a computer as a two dimensional array of optimal filter coefficients (i.e. matched filter coefficients). The optimized filter can be used to recognize, separate, and operate on directionally dependent image contents. The coefficients of the optimized filter may be tailored (or matched) to the contents of the image.

FIG. 1 depicts an example of applying an optimized directional transform to an image. In the example depicted, an image 101 is provided.

The description of filter optimization provided below, including steps S102 to S106, is described in more detail in the context of FIG. 5 and FIG. 8. The exemplary approach described in steps S102 to S106 involves determining a degree of optimization that quantifies signal processing quality criterion. In particular, the signal processing criterion may be used as an objective function for numerical optimization. The signal processing quality criterion may be directly related to the quality of a transformation derived from the image 101.

Steps S102 to S106 may include modeling alterations of the image 101 on its way through directional filters (i.e. a filter bank) in order to link filter coefficients to the objective function for numerical optimization. The model may incorporate second order statistics of the image 101 and thus allows for directional filters matched to the image 101.

At step S102, the image 101 is provided to a similarity function describing a degree of difficulty of deriving the transformation of the image 101. In particular, the similarity function may measure similarity across neighboring portions of the image 101. In the specific example of FIG. 1, the similarity function is implemented as an autocorrelation function. The similarity function may be calculated for the image 101.

Figure 5:
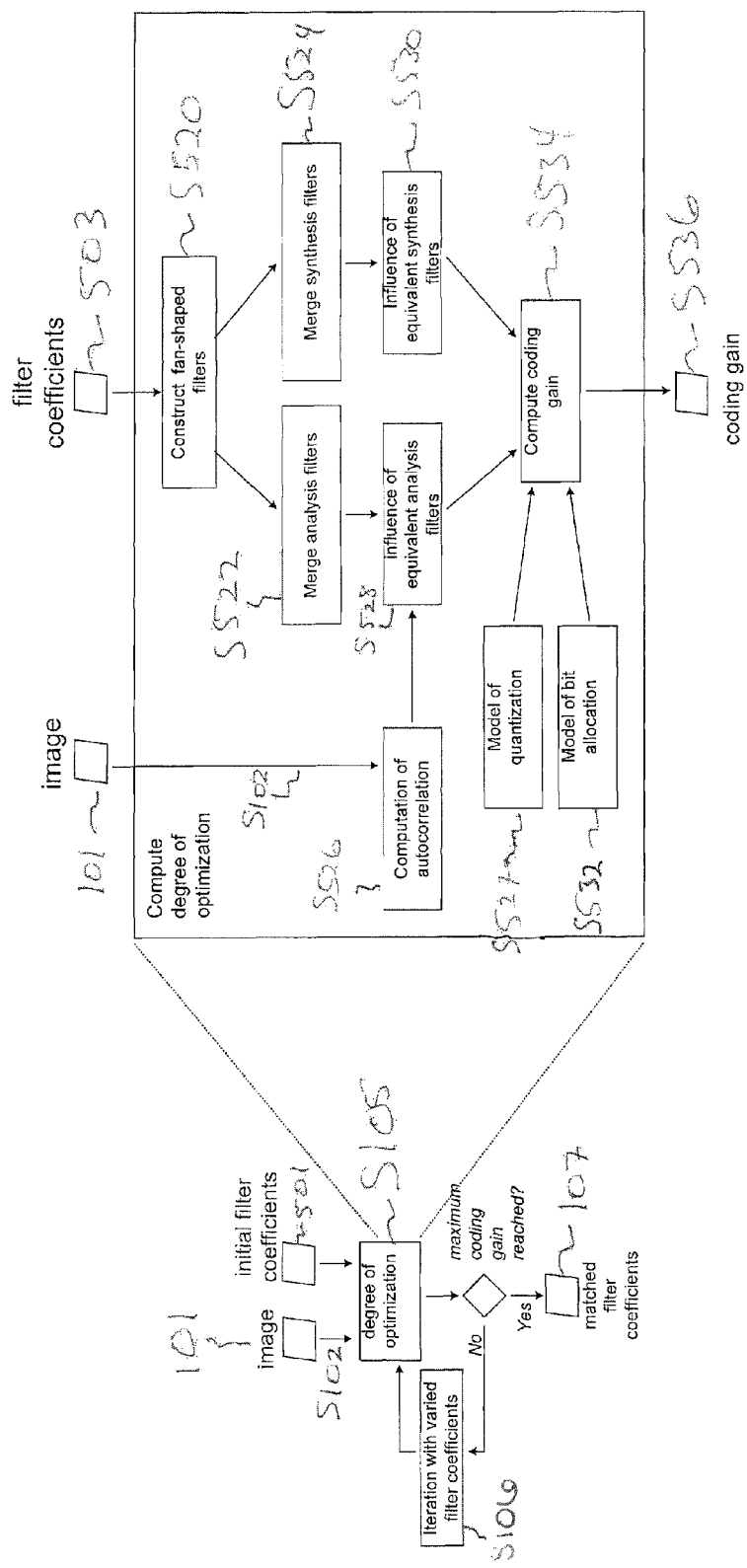
FIG. 5 shows a flow diagram describing a method for optimizing a digital filter.

At S105, a degree of optimization is determined with initial filter coefficients 501 of an analysis filter (see FIG. 5). In other words, the degree of optimization of the initial filter coefficients 501 is calculated.

The initial filter coefficients 501 may have arbitrary values. For example, the initial filter coefficients 501 may have the value 0. Alternatively, the initial filter coefficients 501 may be generic filter coefficients. As another alternative, the initial filter coefficients 501 may be so-called "PKVA" filter coefficients. PKVA filters are described in S. M. Phoong, C. W. Kim, P. P. Vaidyanathan, and R. Ansari, "A new class of two-channel biorthogonal filter banks and wavelet bases," IEEE Transactions on Signal Processing, vol. 43, no. 3, pp. 649-665, 1995, which is incorporated herein by reference. The PKVA filter coefficients are an example of directional generic filter coefficients (i.e. filter coefficients that produce an efficient representation when used in a directional transform). Another example of directional generic filter coefficients are variants of biorthogonal Cohen-Daubechies-Feauveau (CDF) filter coefficients.

The initial filter coefficients 501 (e.g. the PKVA filter coefficients) be complete filters. For example, the initial filter coefficients 501 may have been modulated toward a fan-shaped frequency characteristic. Filters having the fan-shaped frequency characteristic, or that have been modulated toward the fan-shaped frequency characteristic, may be referred to as fan-shaped filters. Fan-shaped filters are discussed in more detail in the context of FIGS. 3 and 4. It may be that fan-shaped filters used for deriving a transformation from the image 101 are different from those used for deriving a reconstruction of the image 123 from the transformation (i.e. the complete synthesis filters are different from the complete analysis filters).

Alternatively, the initial filter coefficients 501 may be partial filters. The partial filters may be characterized in that the same partial filters used for deriving the transformation of the image can also be used for deriving the reconstruction of the image 123 from the transformation (i.e. the partial analysis filters are the same as the partial synthesis filters). This may have the effect of allowing the numerical optimization (described in step S106) to be carried out without constraints, e.g. without the need to ensure invertibility of the filters (i.e. without the need to ensure that). This may make the numerical optimization more efficient.

The partial filters may have fewer filter coefficients than complete filters. The partial filters may have a cross shaped frequency spectrum (i.e. when represented in the frequency domain, the partial filters may have a cross shape).

In the specific example that follows, the partial filters are implemented as lifting filters. However, other partial filters could be used.

The degree of optimization quantifies a signal processing quality criteria with the initial filter coefficients 501. In other words, the degree of optimization may quantitatively describe the application of the initial filter coefficients 501 as part of a directional transform in order to derive the transformation of the image. The degree of optimization may also quantitatively describe the reconstruction of the image 123 derived from the transformation.

For example, the signal processing quality criteria may be implemented as maximum coding gain. Thus, the degree of optimization may be a quantity of the coding gain that measures error introduced into the transformation when applying the directional transform to the image 101 (or to the high frequency portion of the image) in order to derive the transformation, and also measures error introduced into the reconstruction of the image 123 when deriving the reconstruction from the transformation.

The signal processing quality criteria could also be implemented as structural similarity of the image and a reconstruction of the image, optimum entropy, or variance of the transformation Deriving the transformation of the image may also be referred to as transforming the image 101. Deriving the reconstruction of the image 123 from the transformation may also be referred to as reconstructing the image 101.

At step S106, the initial filter coefficients 501 are varied as part of an iterative optimization to produce varied filter coefficients 503 (see FIG. 5). The varied filter coefficients 503 are iteratively optimized. Iteratively optimizing the varied filter coefficients 503 may involve repeatedly varying (i.e. modifying or changing) the varied filter coefficients 503 and then determining the degree of optimization with the varied coefficients. The varied filter coefficients 503 may be iteratively optimized according to a numerical optimization method.

For example, the numerical optimization method may be gradient based and/or nonlinear. According to a specific example, the numerical optimization method may be the well-known nonlinear conjugate gradient method.

The varied filter coefficients 503 may be optimized until optimal filter coefficients 107 (also referred to as the optimized filter or the matched filter coefficients) are found. The optimal filter coefficients 107 may have a maximum (i.e. the highest possible) degree of optimization according to the signal processing quality criterion), or until a maximum number of iterations has been performed. The maximum number of iterations may be between approximately 100 and approximately 1000. The optimal filter coefficients 107 may be directional filter coefficients. The optimal filter coefficients 107 may be optimized specifically for image coding.

Using directional generic filter coefficients as the initial filter coefficients 501 may reduce the number of iterations required to determine optimal filter coefficients in comparison to using a set of zeros as the initial filter coefficients 501 or using non-directional generic filter coefficients.

The optimized filter may concentrate the energy of the image 101 into a small number of significant coefficients that can be coded efficiently. This concentration of energy may occur because the optimized filter enables basis functions of the transform to be matched to image structures (e.g. edges and textures) of the image 101. In particular, the optimized filter may concentrate the energy of the image 101 more effectively than the generic filter. In other words, a transformation derived using the optimized filter may represent the image 101 more efficiently than a transformation derived using the generic filter.

Starting from well-known generic filter coefficients, such as the PKVA filter coefficients, may have the effect of enabling faster optimization of the filter coefficients.

In some cases, a separable transform, e.g. wavelets, may be unsuitable, e.g. because characterizing elements of the image 101 are not aligned along columns and rows. Therefore, the directional transform, which combines directional sensitivity with spatial sensitivity and frequency sensitivity may achieve better results. In particular, the directional transform may produce a transformation that more accurately approximates image structures using fewer coefficients than the separable transform. In the example below, the Contourlet transform is described. However, other suitable directional transforms could also be used.

Steps S108 to S116 describe applying the directional transform to the image 101 in order to derive the transformation from the image 101, and further describe deriving the reconstruction of the image 123 from the transformation. The transform may be used in lossy image transform coding.

At step S108, the image 101 may be separated (i.e. partitioned) into a high pass part 109 and a low pass part 111. Step S108 may be carried out using a Laplacian pyramid (also referred to as a prediction residual pyramid), which is described in Rafael C. Gonzales and Richard E. Woods, "Digital Image Processing", $3^{rd}$ Edition, 2008, pp. 463-466). The Laplacian pyramid may be implemented using biorthogonal Daubechies 9/7 filters.

Due to redundancy of the Laplacian pyramid, image edges are represented without aliasing in the high pass part 109 at the price of an increased number of coefficients compared to pixels in the image 101. To get a finer frequency resolution, filtering may be iterated on the low-pass part 111.

Applying the direction transform to the image 101 may be understood as applying the direction transform to the high pass part 109.

The low pass part 111 may be understood as a smooth version of the image 101, meaning that fine details of the image 101 are less prominent (or missing) from the low pass part 111. These fine details include directional structures (e.g. edges) in the image 101. The fine details are more prominent (or included) in the high pass part 109. The image 101 can be reconstituted by recombining the high pass part 109 with the low pass part 111.

At step S110, the high pass part 109 may be separated (i.e. dissected) into channels according to the orientations of elements (e.g. edges) of the high pass part 109. Each of the channels may define a range of edge orientations. In the specific example of FIG. 1, there are only two edge orientations in the high pass part 109, and each orientation is separated into a different channel. All edges in the image 101 must be categorized into a channel. Accordingly, when there are only 2 channels, each channel covers a range of 180 degrees. More complex images may be divided into more channels.

The separating may be accomplished by a combination of directional filtering and quincunx downsampling.

The directional filtering may involve applying a directional analysis filter have the optimal filter coefficients 107. The directional analysis filter may be applied to the high pass part 109 to obtain horizontal edges 113. The directional analysis filter may be applied to the high pass part again, e.g. after a 90 degree rotation, in order to obtain vertical edges 115. The directional analysis filter may be a complete filter, however, other filters could also be used, e.g. partial filters.

Using partial filters (e.g. lifting filters) as directional analysis filters may be more efficient. In particular, partial filters may have fewer filter coefficients than complete filters (e.g. fan-shaped filters).

Quincunx downsampling may be applied to the high pass part 109 in order to rotate the high pass part 109. Other techniques for rotating the image are also envisioned, e.g. a sampling scheme based on a hexagonal lattice. The quincunx downsampling may be used to in combination with the directional filtering and is described in more detail in the context of FIG. 2.

At step S112 coefficients of the vertical edges 115 may be discarded or approximated to produce transformed part 117. For example, coefficients of the vertical edges 115 that contribute less to the visual appearance of the image 101 may be discarded or approximated. Approximating may be understood as compressing or quantizing.

For example, if the vertical edges 115 were originally represented with a byte per pixel, they may be quantized to 3 bits per pixel. Quantizing may be performed using any of a number of techniques including SPIHT, adaptive, uniform, dead-zone, or vector.

Similar to step S112, at step S114, coefficients of the horizontal edges 113 may be discarded or approximated (i.e. quantized or compressed) to produce transformed part 119.

Similar to steps S112 and S114, at step S116 the low pass part 111 may be approximated (i.e. quantized or compressed) to produce transformed part 121.

The combination of the transformed parts 117 and 119 may be referred to as the transformation of the image. In view of the quantizing of the image 101 when deriving the transformation, the process described in steps S108 to S116 may be referred to as lossy compression. The transformation of the image may be understood as an approximation of the high pass part 109.

At step S118, the transformed parts 117, 119, and 121 may be recombined into the reconstruction of the image 123. This may be achieved by reversing the operations performed in steps S108 and S110 using a directional synthesis filter having the optimal filter coefficients 107 in combination with quincunx upsampling. The recombining may be described as deriving the reconstruction of the image 123 from the transformation of the image. The deriving may comprise decompression, such that the reconstruction of the image may be understood as being decompressed. The reconstruction of the image 123 may be derived via perfect reconstruction.

The difference between the reconstruction of the image 123 x̃ and the image 101 x may be described as reconstruction error, i.e. x̃−x. A goal of filtering may be to minimize the reconstruction error. The degree of optimization may be quantified by a model (e.g. a system model) that describes modifications of the image from x to x̃, i.e. from the image 101 to the reconstruction of the image 123. In other words, the model describes reconstruction error in the reconstruction of the image 123. The degree of optimization may quantify the reconstruction error (or a normalized variant of the reconstruction error) described by the model. For example, the model may comprise a number of equations, and the degree of optimization may be the final output of the equations.

The directional analysis and synthesis filters described in steps S110 to S116 may be referred to as a directional filter bank.

Figure 2:
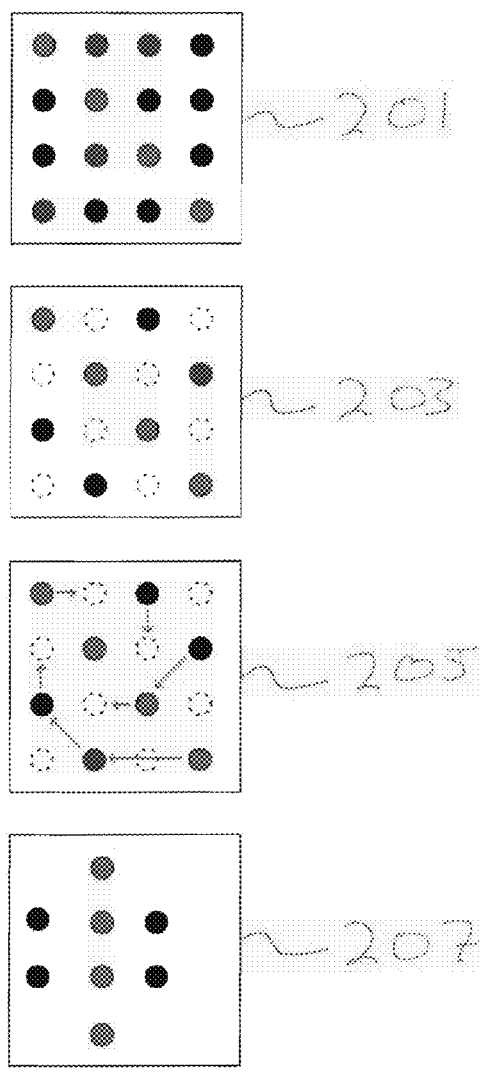
FIG. 2 depicts an example of quincunx sampling.

FIG. 2 shows an example of Quincunx downsampling. In the specific example, an edge is rotated by 45 degrees.

An original image 201 includes 16 pixels sampled according to a Cartesian sampling scheme.

A diagonal edge of the original image 201 is indicated by 4 blue pixels. The diagonal edge extends from the top left corner of the original image 201 to the bottom right corner of the original image 201.

After carrying out a first Quincunx sampling step, an image 203 is produced. The first Quincunx sampling step involves deleting every second pixel of the original image 201 in a Quincunx pattern.

Application of a second Quincunx sampling step results in an image 205. Arrows in the image 205 show how the remaining pixels in the image 203 are shifted into gaps left after deleting every second pixel from the original image 201. Thus, the remaining pixels in the image 203 are consolidated depending on the desired amount of rotation.

Consolidation produces a Quincunx sampled image 207. The diagonal edge of the original image 201 has become a vertical line of 4 pixels extending from the top of the Quincunx sampled image 207 to the bottom of the Quincunx sampled image 207. The 4 pixels of the vertical line of 4 pixels are blue.

Rotation by angles other than 45 degrees can be achieved by different shifting schemes in the second Quincunx sampling step.

FIG. 3 shows part of a matrix of filter coefficients of a fan-shaped filter. The specific example of FIG. 3 shows a PKVA fan-shaped filter. The fan shaped filter is an example of a complete filter.

The fan-shaped filter may let edges having orientations within a narrow range pass through and suppress edges having any other orientation.

The filter coefficients of the fan-shaped filter generally have values between −1 and 1. The set of filter coefficients may be understood as a representation of the fan-shaped filter in the spatial domain.

Figure 4:
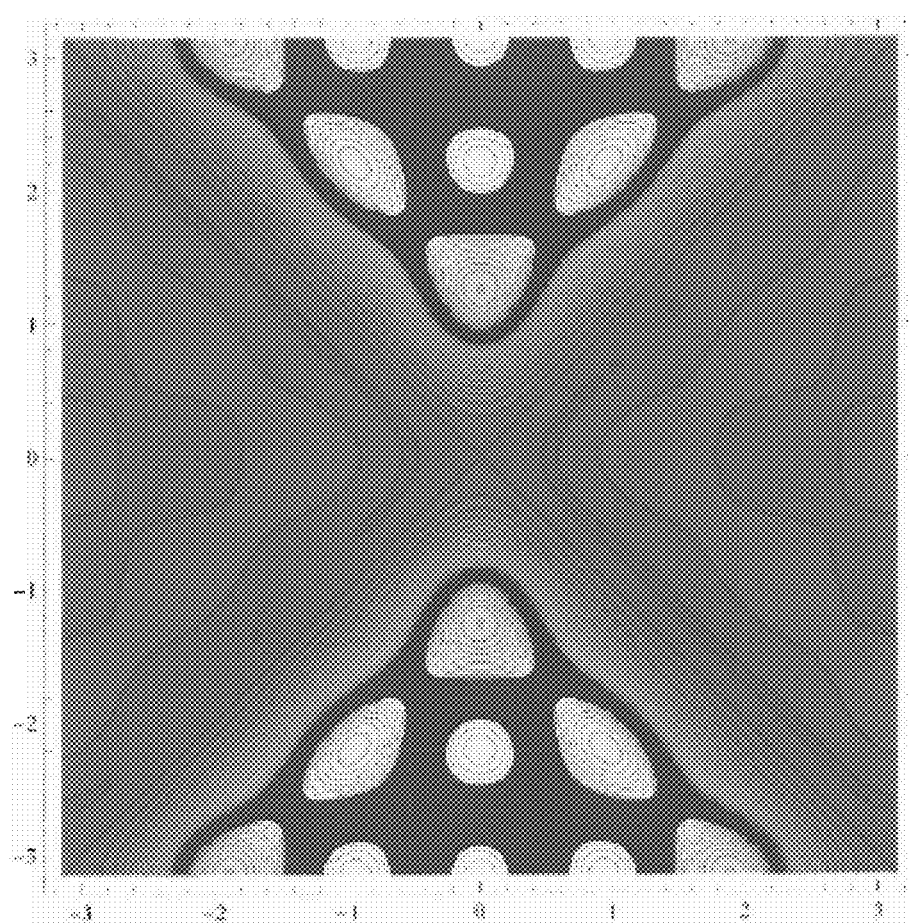
FIG. 4 depicts a Fourier transform of a fan-shaped analysis filter.

FIG. 4 shows a Fourier transform of the filter of FIG. 3. The Fourier transform of FIG. 4 may be understood as the frequency information of the filter of FIG. 3. The red triangular portions extending from the left and right sides of the transform and tapering toward a point in the center define frequencies that are let through the filter. The blue triangular portions extending from the top and bottom of the transform and tapering to a point in the center define frequencies that are filtered out.

FIG. 5 shows a method for optimizing digital filter coefficients. The digital filter coefficients can be applied to an image (e.g. the image 101) in order to derive a transformation from the image. In addition, the digital filter coefficients can be applied to the transformation in order to derive a reconstruction of the image from the transformation.

In particular, FIG. 5 depicts the optimization discussed in connection with steps S102 to S106 of FIG. 1 in more detail. Step S105, determining the degree of optimization that quantifies a signal processing quality criteria, is broken down into a number of sub-steps S520 to S536.

Figure 6:
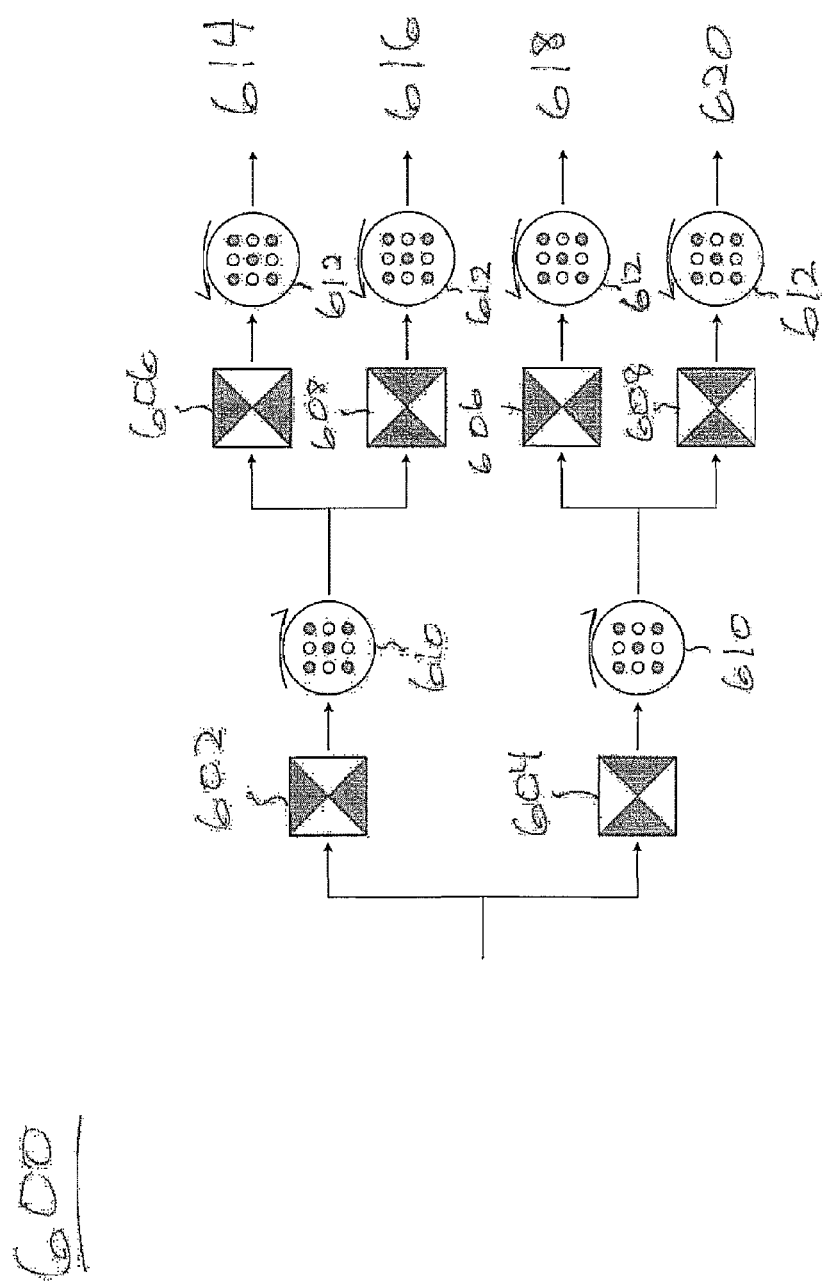
FIG. 6 shows a directional filter bank.
Figure 7B:
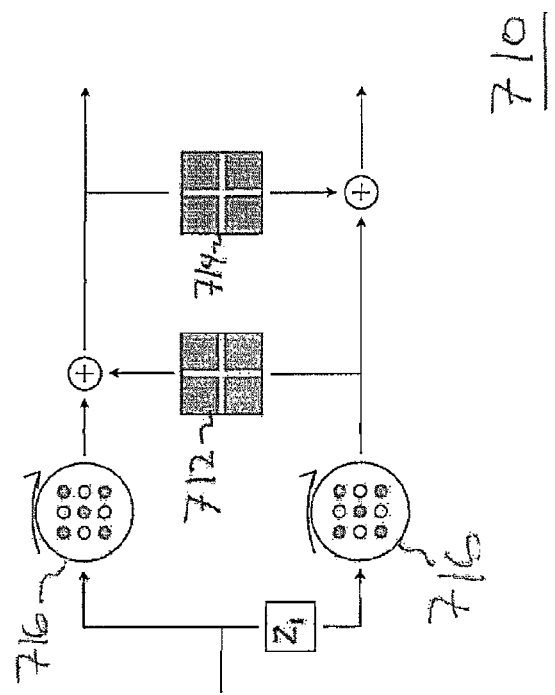
FIG. 7B shows a lifting filter bank.
Figure 7A:
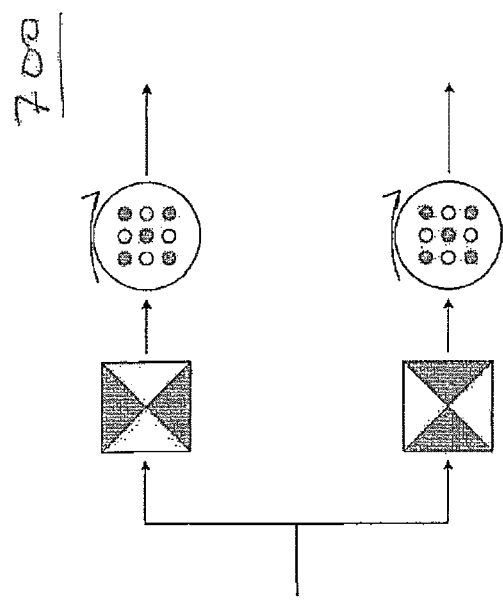
FIG. 7A shows another directional filter bank.

FIG. 6, FIG. 7A and FIG. 7B show specific aspects (e.g. a filter bank of complete filters, and the order of application of Quincunx sampling and lifting filters) described in the context of FIG. 5.

To determine the degree of optimization, the image 101 and the initial filter coefficients 501 are received. In the specific example of FIG. 5, the initial filter coefficients 501 define a plurality of lifting filters. However, as discussed in connection with FIG. 1, any initial filter coefficients may be used.

Starting with partial filters (e.g. lifting filters) may ensure invertibility (i.e. reversibility) of filtering because the same partial filters may be used as analysis filters and synthesis filters. In other words, the same partial filters may be used to derive the transformation from the image, and to derive the reconstruction of the image from the transformation. This could enable more efficient optimization, since it is unnecessary to ensure invertibility of the filtering when optimizing the filter coefficients. In contrast, if the initial filter coefficients defined complete filters (e.g. fan-shaped filters), then it might be necessary to constrain optimization of the filter coefficients in order to ensure invertibility of the filtering when optimizing the filter coefficients.

In the specific example that follows, lifting filters and fan-shaped filters are described. However, it should be understood that any type of partial filter or complete filter could be used.

When applying the lifting filters to create the transformation of the image, the image 101 may be split polyphase components by Quincunx downsampling operators $Q_0$ and $Q_1$. In other words, the coefficients of the image 101 may be split into disjoint sets of equal size. The lifting filters $P_l$ (including analysis filters $P_0$ and synthesis filters $P_1$) may operate on the polyphase components. The same lifting filters may be used throughout all channels and levels of the directional filter bank.

The lifting filters may comply with the following conditions:

prediction-update symmetry $$P_1(z_0, z_1) = -\tfrac{1}{2} P_0(z_0, z_1), \quad (1)$$

separability $$P_0(z_0, z_1) = -p(z_0) p(z_1), \quad (2)$$

and a symmetric impulse response $$p(z) = \sum_{j=0}^{J-1} (-1)^{j+1} p_j z^{-(j+1)} + (-1)^j p_j z^j \quad (3)$$

This approach creates lifting filters that are structurally identical to the PKVA filters discussed in connection with FIG. 1. The J independent lifting filter coefficients $p_j$ where $j=0 \ldots J-1$ may be subjected to optimization.

Channels and levels of a filter bank are also discussed in connection with FIG. 6.

Application of lifting filters in order to derive a transformation from an image is also discussed in connection with FIG. 7B.

In the following the varied filter coefficients 503 are described. However, it should be understood that the initial filter coefficients 501 are used in the first iteration of steps S520 to S536.

At step S520, fan-shaped filters may be constructed from the varied filter coefficients 503. The following discussion should be understood in the context of FIG. 6, i.e. K=4 (there are 4 channels) and 4 different fan-shaped filters F arranged in a directional filter bank. However, when performing the directional transform discussed in the context of FIG. 1 using the lifting filters, the order of filtering and downsampling steps shown in FIG. 6 are interchanged, as shown in FIG. 7B. In other words, FIG. 6 shows a filter bank of a transform (e.g. the directional transform discussed in connection with FIG. 1) with fan-shaped filters filtering the image 101 before Quincunx downsampling of the image 101. FIG. 7B shows Quincunx downsampling of the image 101 being performed before lifting filters filter the image. Performing Quincunx downsampling before filtering may be more efficient since the downsampling reduces the number of pixels in the image 101 that need to be filtered.

Fan shaped analysis filters $F_i$, i=0 . . . 3 and Quincunx downsampling operators $Q_0$ and $Q_1$, may be understood as discussed in connection with FIG. 6, FIG. 7A and FIG. 7B.

The fan-shaped filters may be constructed from the lifting filters by performing a matrix expansion of the lifting filters, e.g. by expanding transfer function matrices in the z-Domain:

$$\begin{pmatrix} F_{00}(z) & F_{01}(z) \\ F_{10}(z) & F_{11}(z) \end{pmatrix} = \prod_{l=0}^{\lambda-1} \begin{pmatrix} 0 & 1 \\ 1 & P_{2l+1}(z) \end{pmatrix} \begin{pmatrix} 1 & 0 \\ P_{2l}(z) & 1 \end{pmatrix} \quad (4)$$

with $2\lambda$ being the number of lifting steps. Lifting filters and lifting steps are discussed in I. Daubechies and W. Sweldens, "Factoring wavelet transforms into lifting steps," Journal of Fourier Analysis and Applications, vol. 4, no. 3, pp. 247-269, 1998, which is incorporated herein by reference.

Fan shaped analysis filters $F_i$ and fan shaped synthesis filters $E_i$ (where i=0 . . . 3) may be obtained from the lifting filters $P_l$ as follows:

$$F_0(z) = z_1 F_{00}(z^{Q_0}) + F_{01}(z^{Q_0})$$

$$F_1(z) = z_1 F_{10}(z^{Q_0}) + F_{11}(z^{Q_0})$$

$$F_2(z) = z_0 F_{00}(z^{Q_1}) + F_{01}(z^{Q_1})$$

$$F_3(z) = z_0 F_{10}(z^{Q_1}) + F_{11}(z^{Q_1}) \quad (5)$$

$$E_0(z) = z_1^{-1} F_1(-z)$$

$$E_1(z) = -z_1^{-1} F_0(-z)$$

$$E_2(z) = z_0^{-1} F_1(-z)$$

$$E_3(z) = -z_0^{-1} F_0(-z) \quad (6)$$

where $$z^Q = \begin{pmatrix} z_0 \\ z_1 \end{pmatrix}^{\begin{pmatrix} Q_{00} & Q_{10} \\ Q_{01} & Q_{11} \end{pmatrix}} = \begin{pmatrix} z_0^{Q_{00}} & z_1^{Q_{10}} \\ z_1^{Q_{01}} & z_1^{Q_{11}} \end{pmatrix} \quad (7)$$

accounts for Quincunx upsampling. Thus, equations (4), and (5) above show how fan-shaped analysis filters can be derived from lifting filters and equation (6) shows how fan-shaped synthesis filters can be derived from fan-shaped analysis filters. $F_{00}$ to $F_{11}$ are intermediate values used to compute the fan-shaped filters $F_i$. $Q_{00}$ to $Q_{11}$ are elements of Quincunx upsampling matrix Q.

In step S522 the fan-shaped analysis filters for each channel may be merged into equivalent analysis filters, where there is one equivalent analysis filter for each channel.

In step S524, the fan-shaped synthesis filters for each channel may be merged into equivalent synthesis filters, where there is one equivalent synthesis filter for each channel.

Steps S522 and S524 may be carried out once the matrix expansion of the lifting filters has been performed to obtain the fan-shaped analysis filters, and the fan-shaped synthesis filters have been derived from the fan-shaped analysis filters, as described above.

By using the noble identities, one can interchange the order of filtering and resampling and thereby construct the equivalent analysis filters $H_k$ and the equivalent synthesis filters $G_k$ that have an effect that is equivalent to all the fan-shaped filters within one channel k. Thus, for each channel k, there is one equivalent analysis filter and one equivalent synthesis filter.

In the four channel filter bank (having four ranges of orientations) depicted in FIG. 6, the equivalent filter for a particular channel k combines the filters of a first level (see FIG. 6) with upsampled versions of filters of a second level (see FIG. 6), as follows:

$$H_0(z)=F_0(z)F_2(z^{Q_0}) \quad G_0(z)=E_0(z)E_2(z^{Q_0})$$

$$H_1(z)=F_0(z)F_3(z^{Q_0}) \quad G_1(z)=E_0(z)E_3(z^{Q_0})$$

$$H_2(z)=F_1(z)F_2(z^{Q_0}) \quad G_2(z)=E_1(z)E_2(z^{Q_0})$$

$$H_3(z)=F_1(z)F_3(z^{Q_0}) \quad G_3(z)=E_1(z)E_3(z^{Q_0}) \quad (8)$$

Similarly, the quincunx downsampling and upsampling operations can each be combined into resampling with an equivalent dilation matrix:

$$T=Q_0Q_1=2I \quad (9)$$

Equation (8) may be understood to describe the combination of the fan-shaped analysis filters $F_i$ into equivalent analysis filters $H_k$ (step S522). In addition, equation (8) describes the combination of fan-shaped synthesis filters $E_i$ into an equivalent synthesis filters $G_k$ (step S524). The equivalent filters may perform the same function within a directional transform as the fan-shaped filters from which they were derived. However, it may be more efficient to use smaller fan-shaped filters or lifting filters within a transform in comparison to larger equivalent filters.

Thus, there is one equivalent analysis filter and one equivalent synthesis filter per channel. In addition, there is one resampling operator for the equivalent analysis filter and one resampling operator for the equivalent synthesis filter. The resampling operator may be understood as a combination of a downsampling operator and an upsampling operator. The sampling operators may be Quincunx sampling operators, however other suitable sampling operators capable of rotating the image 101 for filtering may also be used.

In steps S528, and S530 the equivalent filers may be used to link the reconstruction error x̃−x (where x is the image 101 and x̃ is the reconstruction of the image 123) to the independent lifting filter coefficients $p_j$ discussed above. The equivalent filters may be characterized by their impulse responses $h_k$ and $g_k$. $h_k$ and $g_k$ may also be referred to as the spatial domain counterparts of the equivalent filters. The equivalent analysis filters $H_k$ and the equivalent synthesis filters $G_k$ may be in the z domain.

The spatial domain counterparts of the equivalent filters may be linked to the reconstruction error by examining second order statistics of the image 101, e.g. variances of the high pass part 109, and variances of the transformation of the image. The transformation of the image may consist of transformation coefficients $y_k$ (e.g. Contourlet coefficients). Thus, the transformation of the image may be understood as an array (e.g. a matrix) whose elements are the transformation coefficients $y_k$.

Variances of the high pass part 109 and the transformation coefficients $y_k$ may be proportional according to a constant of proportionality $A_k$:

$$\sigma_{y_k}^2 = A_k \sigma_{x_1}^2 \quad (10)$$

In step S526, a similarity function describing a degree of difficult of deriving the transformation of the image may be calculated.

In step S528, the equivalent analysis filters for each channel may be applied to a similarity function. In the example below, steps S526 and S528 are combined, i.e. the similarity function is calculated for a pixel of the high pass part 109, and then the corresponding value of the equivalent analysis filter is applied to the output of the similarity function. However, other implementations are also possible.

The variances of the high pass part 109 and the transformation coefficients $y_k$ may be linked by the constant of proportionality $A_k$ as follows:

$$A_k = \sum_{m \in Z} \sum_{n \in Z} h_k(m) h_k(n) \frac{R(m-n)}{R(0)} \quad (11)$$

The constant of proportionality $A_k$ may account for second order statistics of the high pass part 109, i.e. its autocorrelation R and filtering of the high pass part 109 by the equivalent analysis filters $H_k$, whose spatial domain counterpart $h_k$ is used in equation (11). In the context of $h_k$, m and n index the filter coefficients of the equivalent analysis filter. In the context of R (the autocorrelation function), m and n index pixels of the high pass part 109. Thus, equation (11) shows application of the filter $h_k$ to the autocorrelation function R. The constant of proportionality $A_k$ may be calculated for each channel k. Accordingly, equation (11) is applied for each range of orientations (i.e. each channel) in the high pass part 109.

Equation (11) may be understood as an example of how to apply the equivalent analysis filter to a similarity function in order to determine transformation error in the transformation of the image, where $A_k$ represents the transformation error. The similarity function describes how difficult it is to derive a transformation of the image, e.g. how difficult it is to compress the image. For example, an image which contains a large number of similar portions (e.g. a simple image) may be easier to transform than an image with more significant variations (e.g. a complex image).

In this specific example, the autocorrelation function is used as the similarity function. However, other similarity functions are also possible.

Since the equivalent analysis filters are equivalent to the fan-shaped analysis filters and to the lifting filters from which they are derived, the equivalent analysis filters provide insight into error introduced when applying the fan-shaped analysis filters and/or the lifting filters to the high pass part 109 in order to derive the transformation.

Further error is added to the transformation coefficients $y_k$ during approximation (e.g. quantization). This further error may be referred to as quantization error or quantization noise $q_k$. The quantization noise $q_k$ is related to the transformation coefficients in a deterministic way. The quantization noise may be approximated (i.e. modeled) as white uncorrelated noise, whose variance is proportional to the variance of the transformation coefficients $y_k$.

At S527, the variance of the quantization noise $\sigma_{q_k}$ may be calculated as follows:

$$\sigma_{q_k} = \epsilon 2^{-b_k} \sigma_{y_k} \quad (12)$$

Constant $\epsilon$ accounts for the type of quantizer (e.g. uniform, dead-zone, adaptive or vector), and $b_k$ accounts for the number of bits of the quantized transformation (i.e. the quantized signal). In particular, $b_k$ may specify the number of bits allocated to each channel k. $\sigma_{y_k}$ may be the variance of the transformation coefficients.

Using the approximation for quantization noise (i.e. model for quantization noise) provided in equation (12) it is possible to compute the expectation of mean square reconstruction error as a weighted sum of quantization noise over all channels:

$$D_{CT} = \frac{1}{N} \sum_{n \in Z^2} E[(\tilde{x}_1(n) - x_1(n))^2] = \sum_{k=0}^{K-1} B_k \sigma_{q_k}^2 \qquad (13)$$

In equation (13), $x_1$ is the high pass part 109, $\tilde{x}_1$ is a reconstruction of the high pass part 109, n is an individual pixel of the high pass part 109, K represents the total number of channels, and k represents individual channels. CT stands for "Contourlet Transform", "E" refers to expected value, and "N" is the number of pixels in the reconstruction of the image 123. Accordingly, equation (13) may provide an average error per pixel in the reconstruction of the image 123, which is a reconstructed (i.e. decompressed) version of the image 101, derived from the compressed transformation.

The quantization noise $q_k$ is linked to the expectation of mean square reconstruction error calculated in equation (13) by the impulse response of the synthesis filters $g_k$ through a weighting factor $B_k$. $B_k$ accounts for the amplification of the quantization noise $q_k$ due to synthesis filtering by the equivalent synthesis filter $g_k$.

$B_k$ may be calculated in step S530 for each channel k as follows:

$$B_k = \frac{1}{K} \sum_{n \in Z^2} g_k^2(n) \qquad (14)$$

Equation (14) provides an example of how to estimate a synthesis error that would be introduced when applying the equivalent synthesis filters to reconstruct the image from the transformation. Since the equivalent synthesis filters are equivalent to the fan shaped filters and the lifting filters from which they were derived, equation (14) also provides insight into error introduced when applying fan-shaped synthesis filters or lifting filters. The synthesis error may be based on the total number of channels K and/or a quantity describing the magnitude of the filter coefficients of the equivalent synthesis filter, e.g. $g_k^2(n)$.

An exemplary signal processing quality criterion is coding gain. Coding gain may be understood a normalized signal-to-noise ratio between image 101 and the reconstruction of the image 123. The signal processing quality criterion, e.g. the coding gain, may be used as an objective function for optimization of the filter coefficients 503.

Signal-to-noise-ratio (SNR) is a measure of the difference between the image 101 (x) and its counterpart after compression and reconstruction, the reconstruction of the image 123 ($\tilde{x}$). The difference may be measured pixel-wise in terms of the mean square deviation:

$$SNR = \Sigma_n (\tilde{x}(n) - x(n))^2 \qquad (15)$$

The reconstruction error may depend on the quantization noise. As indicated in equation (12), the quantization noise may depend on the number of bits $b_k$ allocated to each channel k=0 . . . K−1, where K is the total number of channels. The quantization noise may also depend on the variance of the transformation coefficients, e.g. the variance of orientation of the edges in the transformation having the range of orientations defined by the channel. It may be more efficient to allocate more bits to channels that have a greater variance $\sigma_{y_k}$ (i.e. more energy) than others.

At S532, given an average number of bits b for all channels, the optimum number of bits for a channel k may be calculated as follows:

$$b_{k_{opt}} = b + \frac{1}{2} lb \frac{KB_k \sigma_{y_k}^2}{\prod_{k=0}^{K-1} (KB_k \sigma_{y_k}^2)^{1/K}} \qquad (16)$$

It may be possible to only calculate the optimal number of bits per channel once.

Accordingly, referring to FIG. 1, a first number of bits may be used to represent the transformed part 117 and a second number of bits may be used to represent the transformed part 119. The first number of bits and the second number of bits may depend on the variance of the transformation coefficients of the transformed part 117 and the variance of the transformation coefficients of the transformed part 119. The first number of bits and/or the second number of bits may be calculated according to equation (16).

Reconstruction error $D_{CT}$ under the assumption of optimal bit allocation can be obtained by substituting the optimal bit allocation (16) into the quantization model (12) and combining the result with the equations that account for filter using the equivalent analysis and synthesis filters, i.e. equations (11) and (13):

$$D_{CT\,opt} = (\epsilon 2^{-b} \sigma_{x_1})^2 \Pi_{k=0}^{K-1} (KA_k B_k)^{1/K} \qquad (17)$$

To normalize this error to the average number of bits b and to the dynamic range of the high-pass part 109, direct quantization of the high pass part 109 may be used as a reference:

$$D_{DQ} = (\epsilon 2^{-b} \sigma_{x_1})^2 \qquad (18)$$

Accordingly, at step S534 the coding gain $\Gamma$ is calculated as the quotient of reconstruction error due to direct quantization (18) and reconstruction error due to the directional transform under the assumption of optimal bit allocation (17):

$$\Gamma = \frac{D_{DQ}}{D_{CT_{opt}}} = \prod_{k=0}^{K-1} (KA_k B_k)^{-1/K} \qquad (19)$$

The calculation of the coding gain $\Gamma$ in equation (19) is an example of calculating the degree of optimization that quantifies the signal processing quality criterion. Since the signal processing quality criterion is based on the filter coefficients 503, the signal processing quality criterion is calculated with the filter coefficients 503.

As can be seen from equation (19), the coding gain can be calculated directly from the transformation error $A_k$, the synthesis error $B_k$ and the total number of channels K.

At step S536, the value determined for the coding gain via equation (19) is output and can be compared with a previously determined coding gain, e.g. a value for the coding gain determined with the initial filter coefficients 501.

The value determined for the coding gain may be understood as a specific example of the degree of optimization of the signal processing quality criterion.

The objective function of the coding gain is linked by the equivalent analysis filters and the equivalent synthesis filters derived in equation (8), and lifting to fan-shaped filter conversion (5) and (6) to the optimization variables (coefficients of lifting filters $P_l$). Maximization of the coding gain by varying the lifting filter coefficients $P_l$ is a nonlinear, nonconvex optimization problem, which may be solved numerically at S106 by using a numerical optimization method, e.g. the well-known nonlinear conjugate gradient method. In some cases, to ensure that optimization converges toward a global maximum, randomly chosen numbers may be used in the initial filter coefficients 501, in addition to the coefficients of the generic filter.

According to equation (11), the optimal filter coefficients 107 may depend on the autocorrelation R of the high-pass part 109.

The optimization process may continue until the maximum degree of optimization is reached (i.e. optimal filter coefficients having an optimal degree of optimization have been determined) or until a predetermined number (e.g. between 100 and 1000) of iterations have been performed.

FIG. 6 shows an exemplary directional filter bank 600 with four channels (i.e. a first channel to a fourth channel) and 2 levels.

The directional filter bank 600 is a more complex version of the directional filter bank used for directional filtering in step S110 of FIG. 1.

In the specific example that follows, the directional filter bank 600 includes a combination of fan-shaped filters 602-608 and Quincunx downsampling operators 610 and 612. In the example of FIG. 6, there are four different fan-shaped filters and two different Quincunx downsampling operators. It should be understood that different filters (e.g. complete filters) and sampling operators could be used.

The fan-shaped filters may be similar to the fan-shaped filter described in connection with FIG. 3 and FIG. 4. The Quincunx downsampling operators may be implemented as described in connection with FIG. 2.

The fan-shaped filters 602-608 let either horizontal or vertical edges pass. Due to the Quincunx downsampling operation:

$$x'(n)=x(Q_j n) \quad (20)$$

with dilation matrices $$Q_0 = \begin{pmatrix} 1 & -1 \\ 1 & 1 \end{pmatrix}$$

$$Q_1 = \begin{pmatrix} 1 & 1 \\ -1 & 1 \end{pmatrix},$$

which causes rotation by 45 degrees, filtering of oblique edges is possible. Other mechanisms of rotation and filtering are also possible.

Additional shearing operators may be used for subdivision into more than four channels.

In equation (20), x is the high pass part 109, x' is a Quincunx sampled version thereof, $Q_j$ is one of the Quincunx downsampling operators 610-612, and n is an index of the coefficients (e.g. of the high pass part 109 or the Quincunx sampled version).

The reconstruction of the image 123 can be produced by reversing the filter bank operations of the analysis filters used to produce the transformation of the image with synthesis filters $E_k$ and upsampling operation $$y'(n) = \begin{cases} y(Q_j^{-1} n), & Q_j^{-1} n \in \mathbb{Z}^2 \\ 0, & \text{otherwise} \end{cases} \quad (21)$$

A first set of transformation coefficients 614 ($y_0$) may be output from the first channel. A second set of transformation coefficients 616 ($y_1$) may be output from the second channel. A third set of transformation coefficients 618 ($y_2$) may be output from the third channel. A fourth set of transformation coefficients 620 ($y_3$) may be output from the fourth channel.

FIG. 7A shows a directional filter bank 700 with fan shaped filters.

The directional filter bank 700 could be used in the directional filtering described in step S110 of FIG. 1.

FIG. 7B shows a directional filter bank with lifting filters.

As can be seen by comparing FIG. 7A and FIG. 7B, the Quincunx downsampling and filtering may be performed in a different order when using lifting filters in comparison to the use of fan-shaped filters.

Lifting filters 712 and 714 may be the lifting filters $P_0$ and $P_1$ discussed in connection with FIG. 5. The lifting filters $P_0$ and $P_1$ may be identical. The lifting filters $P_0$ and $P_1$ may be implemented as 6×6 square matrices.

To perform filtering with lifting filters, the high pass part 109 is split into its polyphase components by the Quincunx downsampling operator 716 ($Q_j$). Splitting the high pass part 109 into its polyphase components may involve dividing the coefficients of the high pass part 109 into two disjoint sets of equal size.

Figure 8:
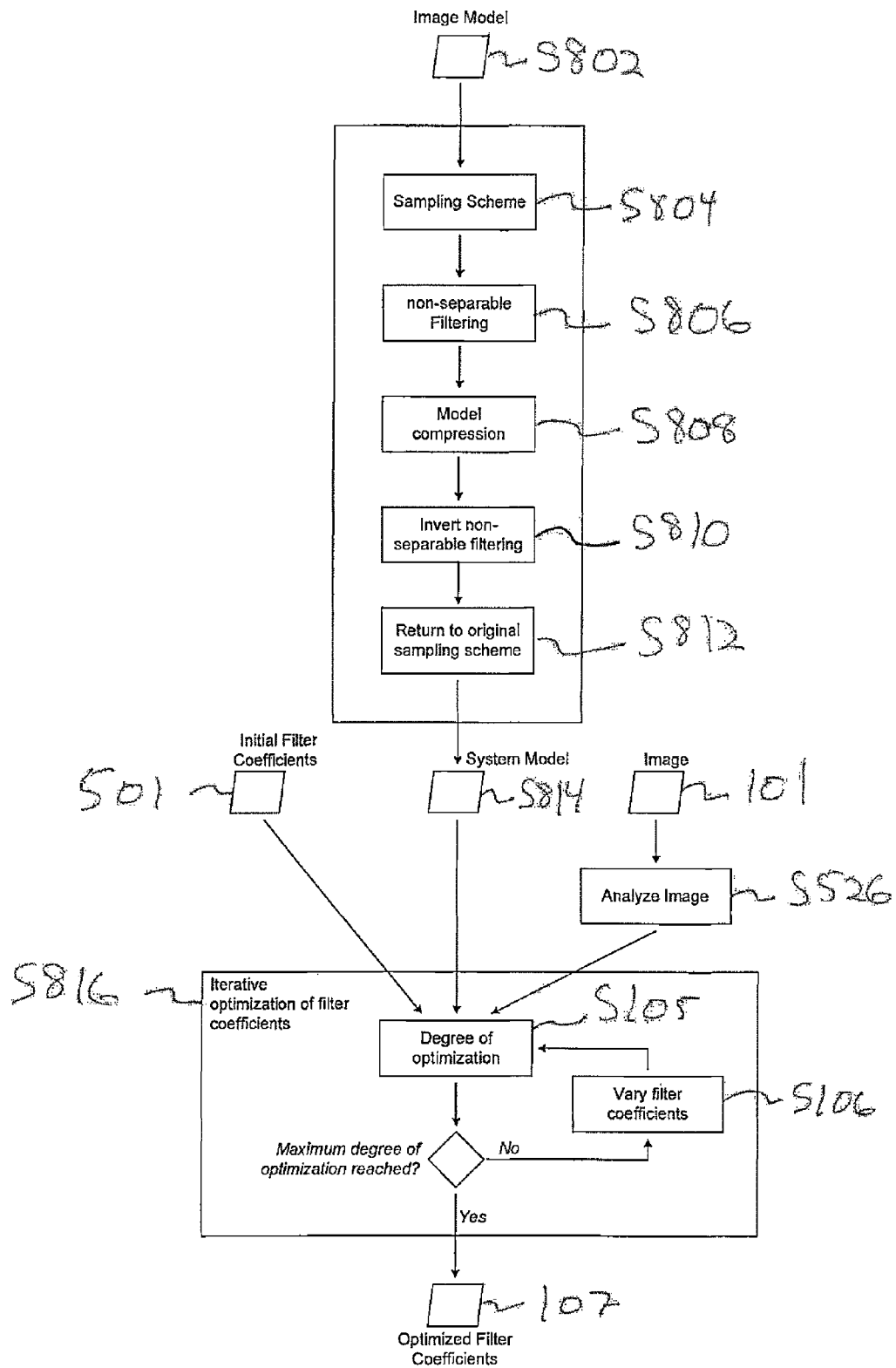
FIG. 8 shows another flow diagram describing a method for optimizing a digital filter.

FIG. 8 shows a method for optimizing digital filter coefficients. The digital filter coefficients can be applied to an image (e.g. the image 101) in order to derive a transformation from the image. In addition, the digital filter coefficients can be applied to the transformation in order to derive a reconstruction of the image from the transformation.

At step S802, a generic image model may be provided. The generic image model may include a sampling scheme (e.g. a standard Cartesian sampling scheme, also referred to as a rectangular pixel grid).

The generic image model may be used as a basis for generating a directional image model (also referred to as a system model). The directional image model may suitable for deriving the transformation of the image, e.g. through compression with non-separable, directional filtering.

At step S804, a sampling scheme suitable for changing the arrangement of pixels of the arbitrary image, e.g. for rotating the arbitrary image, may be added to the directional image model. The sampling scheme may be the Quincunx sampling scheme described in the context of FIG. 2.

The directional image model may only be suitable for a particular filter configuration (e.g. a particular range of edge orientations). The directional image model may be suitable for an arbitrary image.

At step S806, two dimensional, non-separable analysis filters that can be applied to the image as a whole (i.e. blockwise) may be added to the directional image model. These two dimensional non-separable analysis filters may be referred to as directional analysis filters (possibly implemented as partial filters or complete filters). The directional filters may be suitable for isolating directionally dependent image contents.

At step S808, a model of transformation error may be added to the directional image model. The model of transformation error may describe error introduced into the transformation when applying the directional transform to the arbitrary image (e.g. the high pass part 109) in order to derive the transformation. The model of transformation may be part of a model that describes reconstruction error in a reconstruction of the image derived from the transformation.

At step S810, synthesis filters may be added to the directional image model. The synthesis filters may be suitable for reversing (i.e. inverting) the operations of the analysis filters described in step S806. In addition, decompression operators suitable for decompressing the arbitrary image may be added to the directional image model.

At step S812, upsampling operators (e.g. as described in the context of FIG. 5) may be added to the directional model. The upsampling operators may be suitable for arranging the contents of the transformation of the image such that the pixels of the reconstruction of the image are arranged according to a Cartesian grid.

At step S814, the directional model may be output. The directional model may serve as a basis (or input) for steps S520 to S534 discussed in the context of FIG. 5. For example, the analysis filters and the synthesis filters described in the context of steps S806 and S810 may provide structure (i.e. without filter coefficient values) for the partial filters used to construct the complete filters discussed in step S520 (step S520 refers to fan-shaped filters, which are specific example of complete filters).

The initial filter coefficients 501 may be received as described in the context of FIG. 1 and FIG. 5.

At step S526, a similarity function describing a degree of difficulty of deriving the transformation of the image 101 may be calculated. The similarity function may take into account significant aspects of a particular image. Calculating the similarity function may involve determining parameters of the image 101 that provide information about characteristic properties of the image 101. Step S526 is described in more detail the context of FIG. 5.

At step S816, the initial filter coefficients may be optimized (e.g. according to a numerical optimization method) until the optimized filter coefficients 107 are obtained. Step S816 may include steps S105 and S106 (which are described in more detail in the context of FIG. 1 and FIG. 5).

The degree of optimization determined in step S105 may define a quantitative relationship between parameters of the image 101 (obtained via the similarity function) and signal processing quality criteria derived by applying the directional model to the transformation of the image.

The optimized filter coefficients 107 may be optimized according to the similarity function calculated in step S526 and the directional model output in step S814.

Figure 9:
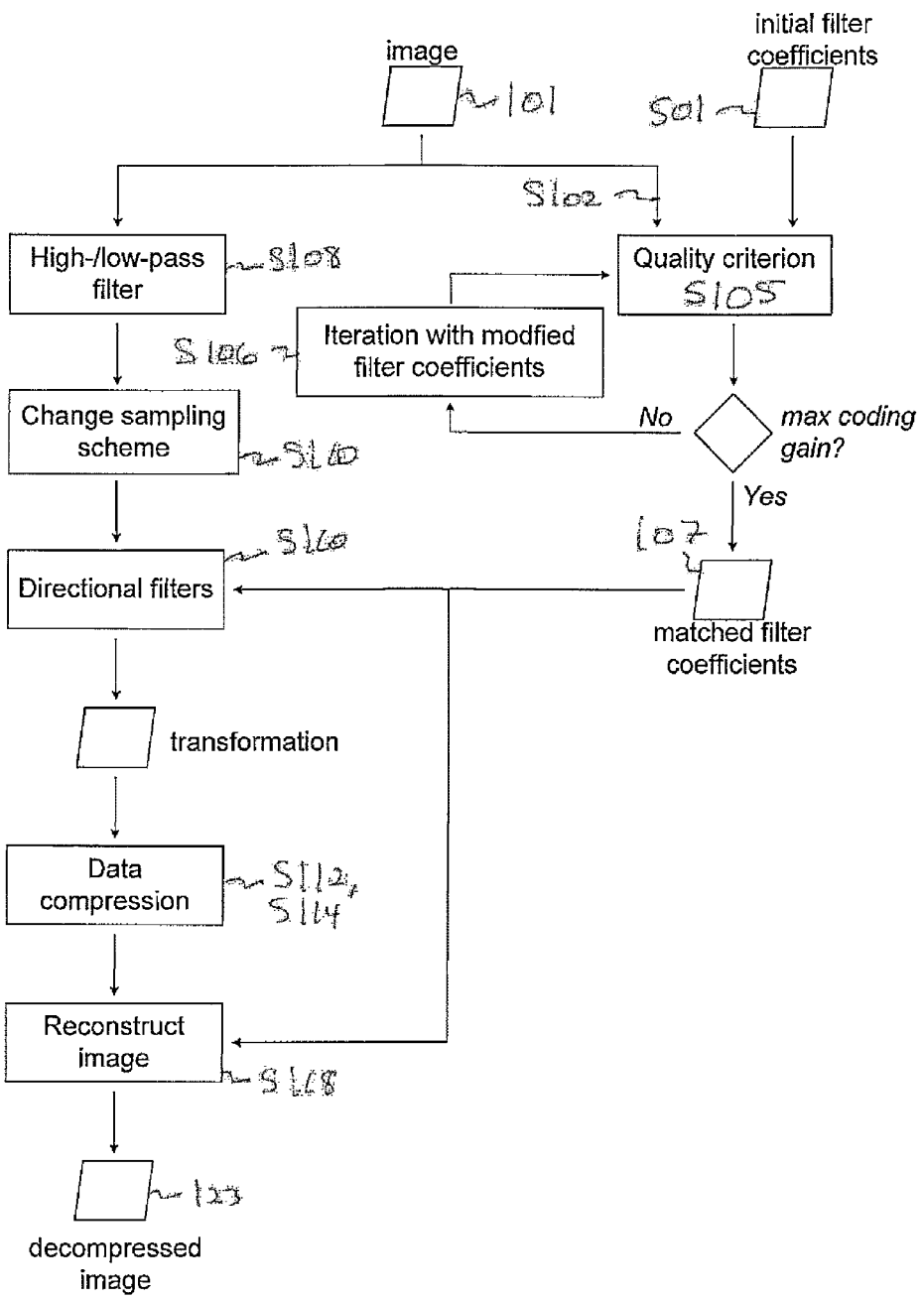
FIG. 9 shows a flow diagram depicting steps for applying a directional transform to an image.

FIG. 9 shows a flow diagram of steps for applying a directional transform to the image 101.

The directional transform may apply the optimal filter coefficients 107 mentioned in the context of FIG. 1.

The steps discussed below are described in more detail in the context of FIG. 1.

At step S102, an image 101 is provided to a similarity function describing a degree of difficulty of deriving the transformation of the image 101.

At S105, a degree of optimization is determined with initial filter coefficients 501 of a digital filter (see FIG. 5). In other words, the degree of optimization of the initial filter coefficients 501 is calculated. The digital filter may be an analysis filter or a synthesis filter.

At step S106, the initial filter coefficients 501 are varied as part of an iterative optimization to produce varied filter coefficients 503 (see FIG. 5).

At step S108, the image 101 may be separated (i.e. partitioned) into a high pass part 109 and a low pass part 111.

At step S110, the high pass part 109 may be separated (i.e. dissected) into channels according to the orientations of elements (e.g. edges) of the high pass part 109.

At step S112 coefficients of the vertical edges 115 may be discarded or approximated to produce transformed part 117.

Similar to step S112, at step S114, coefficients of the horizontal edges 113 may be discarded or approximated (i.e. quantized or compressed) to produce transformed part 119.

The low pass part 111 may be approximated (i.e. quantized or compressed) to produce transformed part 121.

At step S118, the transformed parts 117, 119, and 121 may be recombined into the reconstruction of the image 123. The reconstruction of the image 123 may be understood as a decompressed image since the reconstructed image 123 is reconstructed (i.e. via synthesis filtering and decompression) from the (compressed) transformation of the image.

Figure 10:
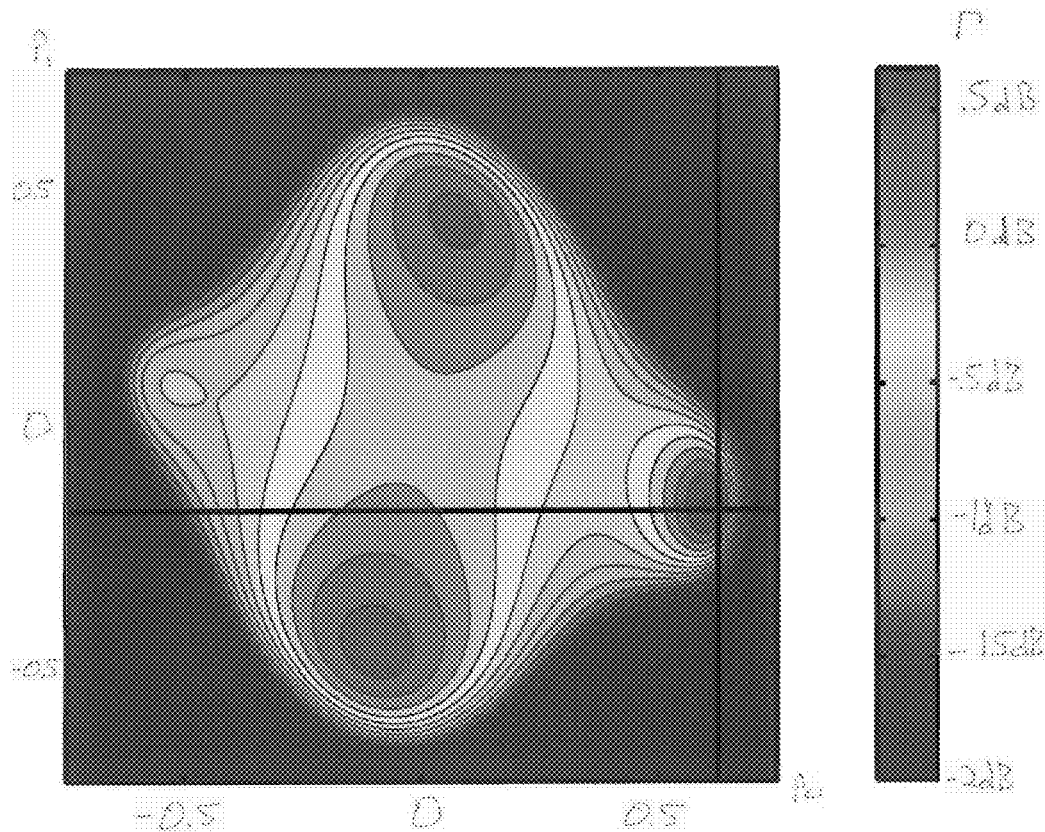
FIG. 10 depicts degrees of optimization of filter coefficients according to a signal processing quality criterion.

FIG. 10 shows coding gain $\Gamma$ as a function of filter coefficients $p_0$ and $p_1$ with $p_2=0.0688$. The coefficients of the generic PKVA filter is indicated with a black cross near the right side, just below the middle of the figure.

Coding gain $\Gamma$ is shown as a function of filter coefficients $P_0$ and $P_1$ for a fixed coefficient $p_2=0.0688$. The measured coding gain of a standard PKVA-filter $(p_0, p_1, p_2)=(0.6261, -0.1794, 0.0688)$ is marked by a cross. Coding gain is 0.50 dB at the position marked by the cross.

An implementation of the method for optimizing digital filter coefficients (as described in the present application) resulted in an optimum coding gain of 0.70 dB for filter coefficients $(p_0, p_1, p_2)=(0.6007, -0.1738, 0.0796)$ for this example.

Figure 13:
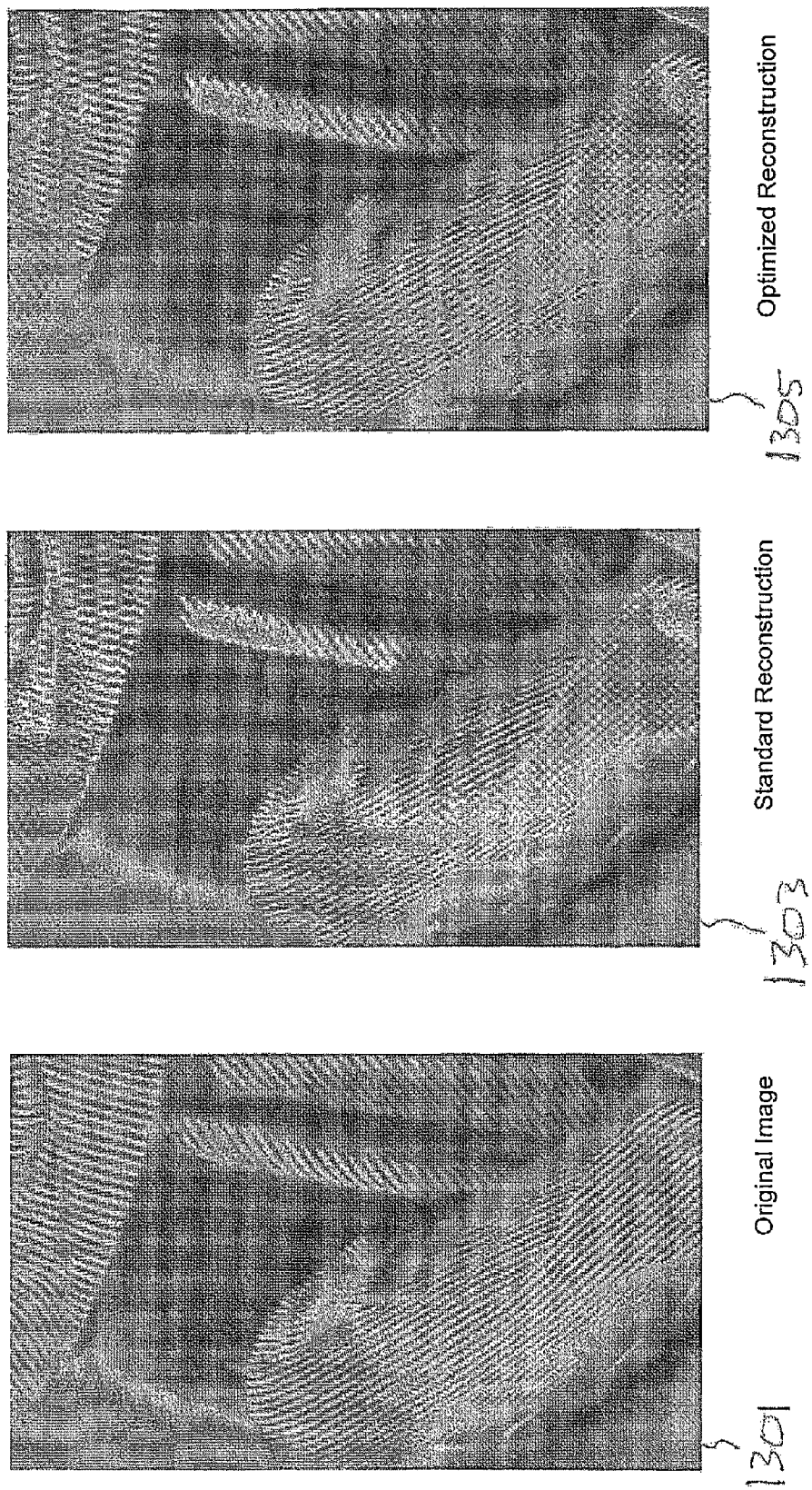
FIG. 13 depicts an original image and two reconstructions derived from different transformations of the original image.

According to a specific implementation, biorthogonal Daubechies 9/7 filters can be used to derive a low pass part of the image e.g. via a Laplacian pyramid, as described in the context of FIG. 1. An optimal filter was obtained for an image 1301, as shown in FIG. 13. The image 1301 was transformed via the optimal filter. The image 1301 is a standard image extracted from a database, and is sometimes referred to as the "Barbara" image.

In the implementation, directional coefficients were approximated (i.e. compressed) by uniform quantization with average number of bits b=2. The low pass part of the image was not quantized.

A reconstruction of the image 1303 using standard PKVA-filters is shown in FIG. 13. A reconstruction of the image 1305 using optimal filters, optimized according to the methods of the present application, is also shown in FIG. 13.

Peak signal to noise ratio (PSNR) is 27.89 dB for the optimal filters compared to 27.76 dB for the standard PKVA filters. Optimization thus provides an improvement in PSNR of 0.13 dB in this example.

Accordingly, it is clear that standard filters do not always produce optimal results. Comparison of an image reconstruction derived using standard filters and an image reconstruction derived using an optimized filters of same the length and symmetry properties may show an advantage of the latter with respect to PSNR and visual appearance of the compressed image.

Figure 11:
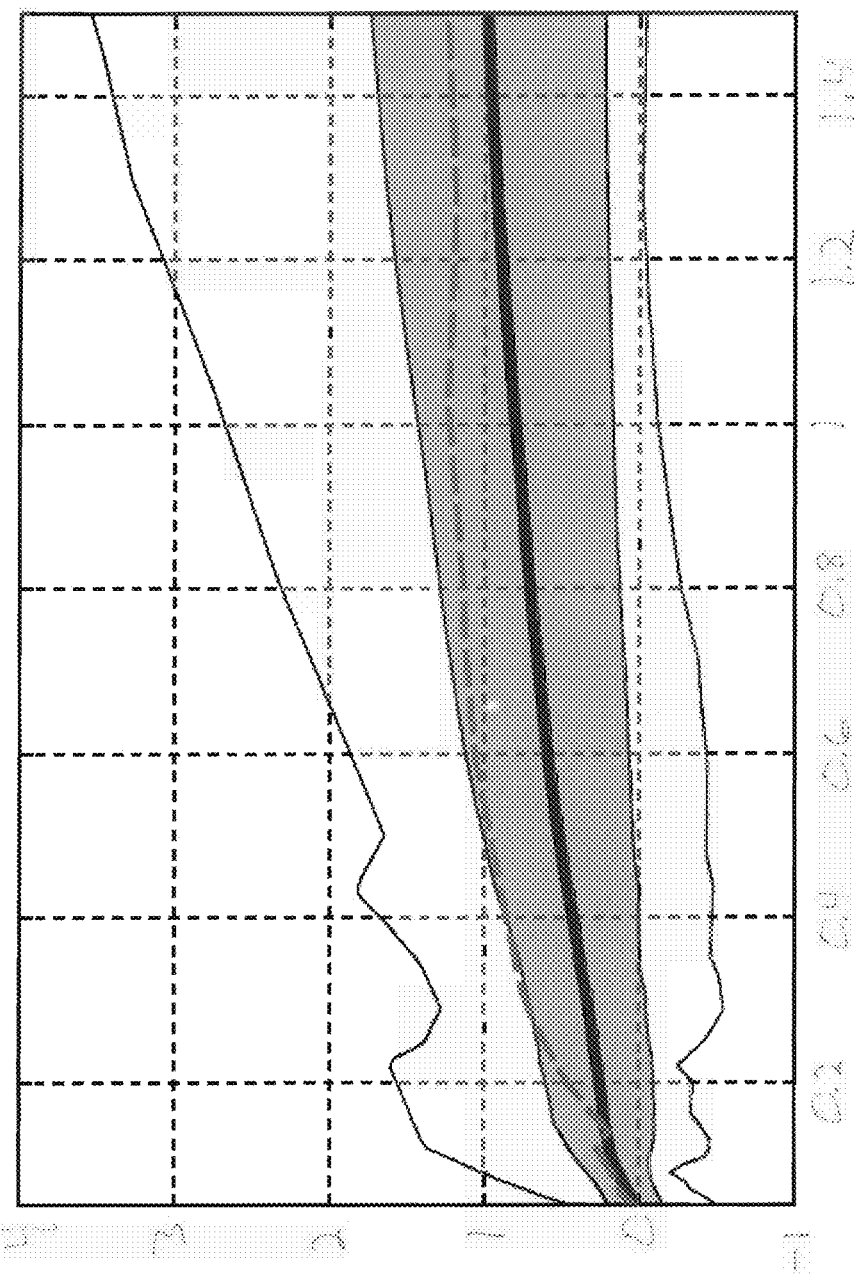
FIG. 11 depicts degrees of optimization of filter coefficients according to another signal processing quality criterion.
Figure 12:
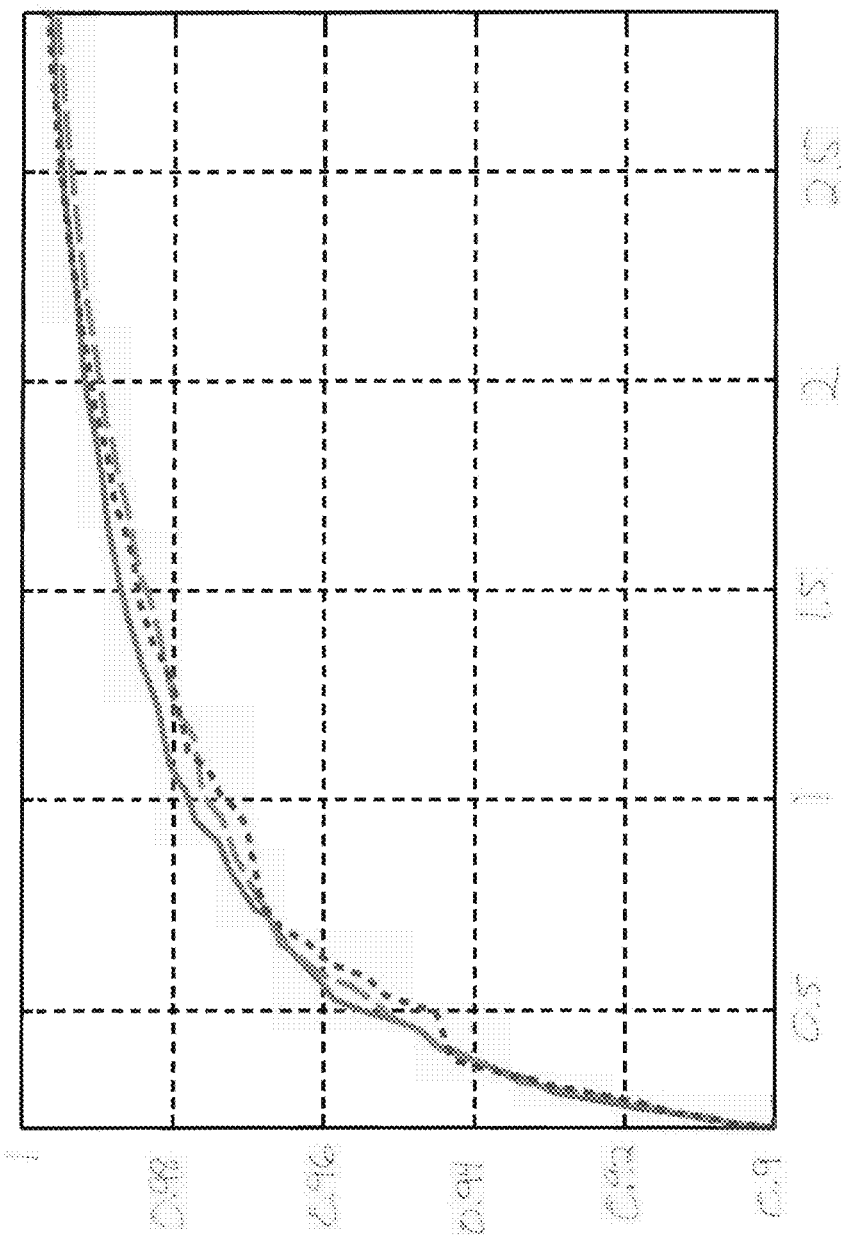
FIG. 12 depicts degrees of optimization of filter coefficients according to yet another signal processing quality criterion.

FIGS. 11 and 12 show results of applying optimized directional filter banks designed for 52 images, consisting of photos from the "Miscellaneous" set of the USC-SIPI Image Database (http://sipi.usc.edu/database/) and all photos of the "New Image Compression Test Set" (http://www.image-compression.info/test_images/).

These images show a broad variety of themes and vary in size between 256×256 pixels and 7216×5412 pixels. The filter banks applied have K=8 directional channels and consist of lifting filters with J=3 independent filter coefficients $p_0$, $p_1$, and $p_2$. The filter coefficients were subject to optimization using the methods discussed in the present application.

FIG. 11 and FIG. 12 show comparisons of the coding performance of the optimized filter banks to the standard filters for the 52 images. As an input to the directional filter banks, the high-pass parts of these images, obtained by Laplacian pyramid filtering with Daubechies 9/7 filters, was used. The resulting directional coefficients were approximated by uniform quantization before synthesis filtering. The available number of bits were allocated to the quantizers in the different directional channels according to equation (16).

FIG. 11 depicts mean and standard deviation alongside the minimum and maximum of the difference in PSNR between transformed high-pass images derived using a standard filter bank and transformed high-pass images derived using an optimized filter bank. Accordingly, FIG. 11 shows a mean of results from the 52 images (thicker black line), bounded by a standard deviation region (dark grey area) and a range (light grey area). Also, a result for exemplary image 4.2.06 of the USC-SIPI database is shown as a dashed red line.

The PSNR is shown as a function of the entropy of the transformation (i.e. the transform coefficients).

Entropy is shown in bits/pixel on the x-axis and change in PSNR is shown in decibels (dB) on the y-axis.

In the specific implementation applied for FIG. 11 and FIG. 12, standard filters were outperformed by 45 out of the 52 optimized filter banks for rates above 0.5 bits per pixel and at least 42 optimized filters keep being advantageous even for lower bitrates. The average performance gap between standard and optimized filters increased with higher bitrates, reaching 1 dB for 1.5 bits/pixel. Gains in PSNR up to 3.5 dB can be reached by optimization for some images.

For the image 4.2.06, PSNR gain of the corresponding optimized filter lies moderately above the mean performance as can be seen from FIG. 11, where both are depicted. In the specific implementation applied for FIG. 11 and FIG. 12, the optimized filter bank was integrated into a three level hybrid coding algorithm using an eight channel Contourlet transform on the finest levels and a wavelet transform on the coarser levels. Daubechies 9/7 filters were used for all frequency filters. In addition, scalar, uniform quantization and arithmetic coding of the coefficients was employed.

FIG. 12 shows a deviation of a compressed image in comparison to its uncompressed counterpart, as measured by SSIM. The deviation is shown as a function of the bitrate for coding with wavelet filters (blue, dotted), hybrid transform with standard filters (green, dashed) and hybrid transform with optimized filters (red, solid).

The x-axis measures bits/pixel and the y-axis measures the SSIM.

Accordingly, the distortion rate curve is shown as a function of bitrate. To achieve a distortion measure that is independent of the objective function of optimization, structural similarity index measure (SSIM) (Z. Wang, A. C. Bovik, H. R. Sheikh, and E. P. Simoncelli, "Image quality assessment: From error visibility to structural similarity," IEEE Trans. Image Process., vol. 13, no. 4, pp. 600-612, 2004.) was used as the signal processing quality criterion.

As a comparison, the distortion rates obtained by replacing the optimized directional filter bank by a standard PKVA filter bank or by a wavelet filter bank are shown. The optimized filter bank performs better than standard filters for almost all bitrates.

FIG. 13 shows an original image, a reconstruction of the image derived from a transformation of the image produced using standard filters, and a reconstruction of the image derived from a transformation of the image using optimal filters.

The invention claimed is:

1. A computer-implemented method for optimizing a digital filter, the method comprising:
  receiving, by a processor, filter coefficients defining the digital filter,
    the digital filter being an analysis filter that is applicable to an image as part of a directional transform to derive a transformation of the image, or
    the digital filter being a synthesis filter that is applicable to the transformation to derive a reconstruction of the image from the transformation,
    the filter coefficients defining a plurality of partial analysis filters;
  performing, by the processor, an expansion of products of matrices of the plurality of partial analysis filters to obtain complete analysis filters suitable for filtering the image;
  combining, by the processor, the complete analysis filters into an equivalent analysis filter;
  selecting, by the processor, a signal processing quality criterion that describes the transformation to be derived from the image and further describes the reconstruction of the image to be derived from the transformation;
  calculating, by the processor, a similarity function describing a degree of difficulty of deriving the transformation of the image;
  applying, by the processor, the equivalent analysis filter to the similarity function in order to determine a transformation error in the transformation of the image;
  determining, by the processor and based on the transformation error, a first degree of optimization that quantifies the signal processing quality criterion with the filter coefficients;
  varying, by the processor, the filter coefficients to obtain varied filter coefficients;
  establishing, by the processor, a second degree of optimization with the varied filter coefficients;
  comparing, by the processor, the first degree of optimization and the second degree of optimization; and
  determining, by the processor, preferred filter coefficients with a better degree of optimization based on comparing the first degree of optimization and the second degree of optimization,
    the preferred filter coefficients including the filter coefficients or the varied filter coefficients.

2. The method of claim 1, further comprising:
  dividing the image into a plurality of channels, each channel defining a range of orientations of directional structures,
    wherein, for each channel, of the plurality of channels, directional structures of the image, oriented within the range defined by each channel, are included in each channel.

3. The method of claim 2,
  wherein the filter coefficients define a plurality of analysis filters for each one of the plurality of channels;
  wherein the plurality of analysis filters are applicable to the image in order to derive the transformation of the image; and
  the method further comprises:
    deriving corresponding synthesis filters from the plurality of analysis filters, wherein the synthesis filters are applicable to the transformation to derive the reconstruction of the image;

assigning one or more of the plurality of analysis filters to each channel; and assigning the synthesis filters corresponding to the plurality of analysis filters to each channel.

4. The method of claim 2, wherein determining the first degree of optimization comprises:

estimating a synthesis error that would be introduced when applying the synthesis filter to reconstruct the image.

5. The method of claim 4, further comprising:

calculating the synthesis error based on a number of the plurality of channels and a quantity describing a magnitude of the filter coefficients.

6. The method of claim 1, wherein each partial analysis filter, of the plurality of partial analysis filters, is suitable for filtering a part of the image.

7. The method of claim 1, wherein the signal processing quality criterion is one of: a maximum coding gain, a structural similarity of the image and the reconstruction of the image, an optimum entropy, or a variance of the transformation.

8. The method of claim 1, further comprising iterating the varying, the establishing, and the comparing to generate a comparison of different sets of filter coefficients, in each iteration, until optimal filter coefficients with an optimal degree of optimization are obtained or until a predetermined number of iterations is performed.

9. The method of claim 8, further comprising:

deriving the transformation of the image by applying the optimal filter coefficients to the image, wherein deriving the transformation comprises applying the directional transform to the image.

10. The method of claim 8, wherein the iterating is performed according to a numerical optimization method using the signal processing quality criterion as an objective function for optimization.

11. A computer-implemented method for optimizing a digital filter, wherein the digital filter is an analysis filter that can be applied to an image as part of a directional transform in order to derive a transformation from the image, or wherein the digital filter is a synthesis filter that can be applied to the transformation in order to derive a reconstruction of the image from the transformation, the method comprising:

receiving, by a processor, filter coefficients defining the digital filter, the filter coefficients defining a plurality of partial analysis filters;

performing, by the processor, an expansion of products of matrices of the plurality of partial analysis filters to obtain complete analysis filters suitable for filtering the image;

combining, by the processor, the complete analysis filters into an equivalent analysis filter;

defining, by the processor, a model that describes a reconstruction error in the reconstruction of the image derived from the transformation;

determining, by the processor, a first degree of optimization of the filter coefficients that quantifies the reconstruction error described by the model;

calculating, by the processor, a similarity function describing a degree of difficulty of deriving the transformation of the image;

applying, by the processor, the equivalent analysis filter to the similarity function in order to determine a transformation error in the transformation of the image;

the first degree of optimization being based on the transformation error;

varying, by the processor, the filter coefficients to obtain varied filter coefficients;

establishing, by the processor, a second degree of optimization with the varied filter coefficients;

comparing, by the processor, the first degree of optimization and the second degree of optimization; and determining, by the processor, preferred filter coefficients with a better degree of optimization based on comparing the first degree of optimization and the second degree of optimization, the preferred filter coefficients including the filter coefficients or the varied filter coefficients.

12. The computer implemented method of claim 11, wherein the reconstruction error comprises:

a transformation error introduced into the transformation when applying the directional transform to the image in order to derive the transformation, and a synthesis error introduced into the reconstruction of the image when deriving the reconstruction of the image from the transformation.

13. A non-transitory computer-readable storage medium comprising:

instructions, which, when executed by one or more processors, cause the one or more processors to:

receive filter coefficients defining a digital filter, the digital filter being an analysis filter that is applicable to an image as part of a directional transform to derive a transformation from the image, or the digital filter being a synthesis filter that is applicable to the transformation to derive a reconstruction of the image from the transformation, the filter coefficients defining a plurality of partial analysis filters;

perform an expansion of products of matrices of the plurality of partial analysis filters to obtain complete analysis filters suitable for filtering the image;

combine the complete analysis filters into an equivalent analysis filter;

select a signal processing quality criterion that describes the transformation to be derived from the image and further describes the reconstruction of the image to be derived from the transformation;

calculate a similarity function describing a degree of difficulty of deriving the transformation of the image;

apply the equivalent analysis filter to the similarity function in order to determine a transformation error in the transformation of the image;

determine, based on the transformation error, a first degree of optimization that quantifies the signal processing quality criterion with the filter coefficients;

vary the filter coefficients to obtain varied filter coefficients;

establish a second degree of optimization with the varied filter coefficients;

compare the first degree of optimization and the second degree of optimization; and determine preferred filter coefficients with a better degree of optimization based on comparing the first degree of optimization and the second degree of optimization, the preferred filter coefficients including the filter coefficients or the varied filter coefficients.

14. The computer-readable storage medium of claim 13, further comprising:

instructions, which, when executed by the one or more processors, cause the one or more processors to:

iterate the instructions that cause the one or more processors to vary the filter coefficients, establish the second degree of optimization, and compare the first degree of optimization and the second degree of optimization, to generate a comparison of different sets of filter coefficients, in each iteration, until optimal filter coefficients with an optimal degree of optimization are obtained or until a predetermined number of iterations is performed.

15. The computer-readable storage medium of claim 13, further comprising:

instructions, which, when executed by the one or more processors, cause the one or more processors to:

divide the image into a plurality of channels, each channel, of the plurality of channels, defining a range of directional structure orientations, wherein, for each channel, directional structures of the image oriented within the range defined by each channel are included in each channel.

16. A system for optimizing a digital filter, the system comprising:

one or more data processing apparatuses; and a data storage apparatus encoded with instructions that, when executed by the one or more data processing apparatuses, cause the one or more data processing apparatuses to:

receive filter coefficients defining the digital filter, the digital filter being an analysis filter that is applicable to an image as part of a directional transform to derive a transformation from the image, or the digital filter being a synthesis filter that is applicable to the transformation to derive a reconstruction of the image from the transformation, the filter coefficients defining a plurality of partial analysis filters;

perform an expansion of products of matrices of the plurality of partial analysis filters to obtain complete analysis filters suitable for filtering the image;

combine the complete analysis filters into an equivalent analysis filter;

select a signal processing quality criterion that describes the transformation to be derived from the image and further describes the reconstruction of the image to be derived from the transformation;

calculate a similarity function describing a degree of difficulty of deriving the transformation of the image;

apply the equivalent analysis filter to the similarity function in order to determine a transformation error in the transformation of the image;

determine, based on the transformation error, a first degree of optimization that quantifies the signal processing quality criterion with the filter coefficients;

vary the filter coefficients to obtain varied filter coefficients;

establish a second degree of optimization with the varied filter coefficients; and compare the first degree of optimization and the second degree of optimization.

17. The system of claim 16, wherein the one or more data processing apparatuses are further to:

iterate the instructions that cause the one or more data processing apparatuses to vary the filter coefficients, establish the second degree of optimization, and compare the first degree of optimization and the second degree of optimization, to generate a comparison of different sets of filter coefficients, in each iteration, until optimal filter coefficients with an optimal degree of optimization are obtained or until a predetermined number of iterations is performed.

18. The system of claim 16, where the one or more data processing apparatuses are further to:

determine preferred filter coefficients with a better degree of optimization based on comparing the first degree of optimization and the second degree of optimization, the preferred filter coefficients including the filter coefficients or the varied filter coefficients.

19. The system of claim 16, where the one or more data processing apparatuses are further to:

divide the image into a plurality of channels, each channel defining a range of orientations of directional structures, where, for each channel of the plurality of channels, directional structures of the image, oriented within the range defined by each channel, are included in each channel.

20. The system of claim 16, where each partial analysis filter, of the plurality of partial analysis filters, is suitable for filtering a part of the image.

* * * * *